US012574975B2

(12) United States Patent
Wu et al.

(10) Patent No.: US 12,574,975 B2
(45) Date of Patent: Mar. 10, 2026

(54) COMMUNICATION METHOD, USER EQUIPMENT, BASE STATION AND STORAGE MEDIUM

(71) Applicant: Samsung Electronics Co., Ltd., Suwon-si (KR)

(72) Inventors: Min Wu, Beijing (CN); Sa Zhang, Beijing (CN); Qi Xiong, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 18/353,520

(22) Filed: Jul. 17, 2023

(65) Prior Publication Data

US 2024/0040628 A1     Feb. 1, 2024

(30) Foreign Application Priority Data

Jul. 26, 2022     (CN) .......................... 202210887898.3

(51) Int. Cl.
H04W 74/0836     (2024.01)
H04W 74/00     (2009.01)
(Continued)

(52) U.S. Cl.
CPC ..... H04W 74/0836 (2024.01); H04W 74/006 (2013.01); H04W 74/04 (2013.01); H04W 74/0833 (2013.01)

(58) Field of Classification Search
CPC ........... H04W 74/0833; H04W 74/006; H04W 74/04; H04W 52/0235; H04W 52/0206;
(Continued)

(56) References Cited

U.S. PATENT DOCUMENTS

| | | | |
|---|---|---|---|
| 2016/0088681 A1 | 3/2016 | Chang et al. | |
| 2016/0242123 A1 | 8/2016 | Harada et al. | |

(Continued)

FOREIGN PATENT DOCUMENTS

| | | |
|---|---|---|
| JP | 2010-193290 A | 9/2010 |
| WO | 2011/125849 A1 | 10/2011 |
| WO | 2014/116049 A1 | 7/2014 |

OTHER PUBLICATIONS

International Search Report dated Oct. 27, 2023, issued in International Application No. PCT/KR2023/010700.
(Continued)

*Primary Examiner* — Mohamed A Kamara
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A communication method, a user equipment (UE), a base station, and a storage medium are provided. The method includes receiving, by a UE, information related to physical random access channel (PRACH) resources, determining available PRACH resources in an energy saving state and/or non-energy saving state of a base station, and then transmitting a PRACH to the base station based on the available PRACH resources and the state of the base station. The method may reduce the amount of PRACH resources to be monitored by the base station, thereby achieving the purpose of saving power on the base station side.

16 Claims, 9 Drawing Sheets

Receive information related to PRACH resources, and determine available PRACH resources in an energy saving state and/or non-energy saving state of a base station ~ S101

Transmit a PRACH to the base station based on the available PRACH resources and the state of the base station ~ S102

(51) Int. Cl.
    *H04W 74/04*       (2009.01)
    *H04W 74/0833*    (2024.01)
(58) Field of Classification Search
    CPC ........... H04W 52/0212; H04W 74/002; H04W
             74/004; H04W 76/27; H04W 48/10;
          H04W 72/0446; H04W 72/1268; H04W
            72/232; Y02D 30/70; H04L 5/0053
    See application file for complete search history.

(56)                References Cited

U.S. PATENT DOCUMENTS

| | | | |
|---|---|---|---|
| 2019/0215870 A1* | 7/2019 | Babaei | H04W 24/10 |
| 2020/0154354 A1 | 5/2020 | Awoniyi-Oteri et al. | |
| 2021/0058973 A1* | 2/2021 | Fujishiro | H04W 72/04 |
| 2021/0120486 A1 | 4/2021 | Onaka et al. | |
| 2021/0204330 A1* | 7/2021 | Tang | H04W 72/0453 |
| 2021/0321226 A1 | 10/2021 | Zhang et al. | |
| 2024/0349293 A1* | 10/2024 | Liu | H04W 52/0206 |

OTHER PUBLICATIONS

Extended European Search Report dated Sep. 18, 2025; European
Appln. No. 23846946.4-1206 / 4544868 PCT/KR2023010700.

* cited by examiner

FIG. 5

```
RACH - ConfigCommon ::=              SEQUENCE {
  rach - ConfigGeneric               RACH - ConfigGeneric,
  totalNumberOfRA - Preambles        INTEGER (1..63)                OPTIONAL,   -- Need S
  ssb - perRACH - OccasionAndCB - PreamblesPerSSB   CHOICE {
    oneEighth                                                                   ENUMERATED
{ n4, n8, n12, n16, n20, n24, n28, n32, n36, n40, n44, n48, n52, n56, n60, n64 },
    oneFourth                                                                   ENUMERATED
{ n4, n8, n12, n16, n20, n24, n28, n32, n36, n40, n44, n48, n52, n56, n60, n64 },
    oneHalf                                                                     ENUMERATED
{ n4, n8, n12, n16, n20, n24, n28, n32, n36, n40, n44, n48, n52, n56, n60, n64 },
    one                                                                         ENUMERATED
{ n4, n8, n12, n16, n20, n24, n28, n32, n36, n40, n44, n48, n52, n56, n60, n64 },
    two                                                                         ENUMERATED
{ n4, n8, n12, n16, n20, n24, n28, n32 },
    four                               INTEGER (1..16),
    eight                              INTEGER (1..8),
    sixteen                            INTEGER (1..4) }
}
```

COMMUNICATION METHOD, USER EQUIPMENT, BASE STATION AND STORAGE MEDIUM

CROSS-REFERENCE TO RELATED APPLICATION(S)

This application is based on and claims priority under 35 U.S.C. § 119(a) of a Chinese patent application number 202210887898.3, filed on Jul. 26, 2022, in the Chinese Intellectual Property Office, the disclosure of which is incorporated by reference herein in its entirety.

BACKGROUND

1. Field

The disclosure relates to the technical field of wireless communication. More particularly, the disclosure relates to a communication method, a user equipment (UE), a base station and a storage medium.

2. Description of Related Art

In order to meet the increasing demand for wireless data communication services since the deployment of fourth generation (4G) communication systems, efforts have been made to develop improved fifth generation (5G) or pre-5G communication systems. Therefore, 5G or pre-5G communication systems are also called "Beyond 4G networks" or "Post-long term evolution (LTE) systems".

In order to achieve a higher data rate, 5G communication systems are implemented in higher frequency (e.g., millimeter wave (mmWave)) bands, e.g., 60 gigahertz (GHz) bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problem and/or disadvantages and to provide at least the advantages described below. Accordingly, an aspect of the disclosure is to provide a method how to reduce the power consumption of communication base stations.

Additional aspects will be set forth in part in the description which follows and, in part, will be apparent from the description, or may be learned by practice of the presented embodiments.

In accordance with an aspect of the disclosure, a method performed by a UE in a communication system is provided. The method includes receiving information related to physical random access channel (PRACH) resources, and determining available PRACH resources in an energy saving state or non-energy saving state of a base station, and transmitting a PRACH to the base station based on the available PRACH resources and the state of the base station.

Optionally, receiving information related to PRACH resources and determining available PRACH resources in an energy saving state or non-energy saving state of a base station includes at least one of the following:

receiving first information configured for indicating available part of PRACH resources or unavailable part of PRACH resources in a first PRACH resource pool in the energy saving state of the base station, and determining available PRACH resources in the energy saving state of the base station according to the first information, or receiving second information configured for configuring a second PRACH resource pool, and determining corresponding available PRACH resources according to the second information and the state of the base station, wherein the second PRACH resource pool is used only in the energy saving state of the base station or the non-energy saving state of the base station.

Optionally, the first PRACH resource pool is configured according to a legacy version of information elements, and the second PRACH resource pool is configured according to a new version of the information elements.

Optionally, the first PRACH resource pool is configured according to a random access channel common configuration information element (RACH-ConfigCommon).

Optionally, the second PRACH resource pool is only used in the energy saving state of the base station, and the first PRACH resource pool is only used in the non-energy saving state of the base station, or, the second PRACH resource pool is only used in the non-energy saving state of the base station, and the first PRACH resource pool is used in the energy saving state of the base station and the non-energy saving state of the base station.

Optionally, the first information and/or the second information is indicated by at least one of the following signaling:

a system information block (SIB), a physical broadcast channel (PBCH), or downlink control information (DCI), wherein the DCI is cell-specific or UE-group-specific.

Optionally, the PRACH resources include RACH occasions (ROs), and the first information indicates available part of ROs or unavailable part of ROs in the first PRACH resource pool through at least one of the following indication granularities:

all ROs in multiple PRACH cycles, all ROs in one association cycle, the association cycle being an association cycle between PRACHs and synchronization signal blocks (SSBs), all ROs in one PRACH cycle, a group of Ros, all ROs associated with one SSB index, all ROs associated with one SSB burst set, all ROs in one time slot, all ROs on one time-domain resource, or one RO.

Optionally, the first information indicates available part of PRACH resources or unavailable part of PRACH resources in the first PRACH resource pool through at least one of the following indication granularities:

all PRACH resources associated with one SSB index, or all PRACH resources associated with one SSB burst set.

Optionally, the first information is indicated by a bit map, each bit in the bit map indicating that the RO or PRACH resource corresponding to the indication granularity is available or unavailable.

Optionally, the association between the available part of PRACH resources in the first PRACH resource pool and SSBs in the energy saving state of the base station apply one of:

an association the same as that in the non-energy saving state of the base station, or an association different from that in the non-energy saving state of the base station.

Optionally, the association between available part of PRACH resources in the first PRACH resource pool and SSBs in the energy saving state of the base station applying an association different from that in the non-energy saving state of the base station includes at least one of the following:

renumbering the available part of ROs, and associating, based on association parameters the same as those in the non-energy saving state of the base station, available part of PRACH resources in the first PRACH resource pool with SSBs, or renumbering the available part of ROs, and associating, based on association parameters different from those in the non-energy saving state of the base station, available part of PRACH resources in the first PRACH resource pool with SSBs.

Optionally, association between the available part of PRACH resources in the first PRACH resource pool and SSBs in the energy saving state of the base station applying an association different from that in the non-energy saving state of the base station includes at least one of:

associating, based on a legacy version of association parameters, the available part of PRACH resources in the first PRACH resource pool with the SSBs, or associating, based on a new version of association parameters, the available part of PRACH resources in the first PRACH resource pool with the SSBs.

Optionally, the transmitting a PRACH to the base station based on the available PRACH resources and the state of the base station includes in the energy saving state of the base station, transmitting a PRACH to the base station based on the available PRACH resources, wherein the PRACH or a random access procedure initiated by the PRACH indicates a wake-up signaling, the wake-up signaling is configured for requesting the base station to switch from the energy saving state to the non-energy saving state.

Optionally, the PRACH or the random access procedure initiated by the PRACH indicating a wake-up signaling includes at least one of:

the wake-up signaling is implicitly indicated by the PRACH, and the PRACH has no random access function, the wake-up signaling is implicitly indicated by the PRACH, and the PRACH has a random access function, the wake-up signaling is indicated by a physical uplink shared channel (PUSCH) of a third step Msg3 in a four-step random access procedure initiated by the PRACH, or the wake-up signaling is indicated by a PUSCH of a first step MsgA in a two-step random access procedure initiated by the PRACH.

Optionally, the PRACH implicitly indicates the wake-up signaling, and the method further includes any one of the following after transmitting a PRACH to the base station:

determining, in a first time unit after a first preset interval starting from transmitting the PRACH, that the base station is switched from the energy saving state to the non-energy saving state, or monitoring a response signaling of the base station after a second preset interval starting from transmitting the PRACH to determine whether the base station is switched from the energy saving state to the non-energy saving state, and if the response signaling indicates that the base station is switched from the energy saving state to the non-energy saving state, determining, in a first time unit after a third preset interval starting from the response signaling, that the base station is switched from the energy saving state to the non-energy saving state.

Optionally, the time unit is a sub-frame, a time slot or an orthogonal frequency division multiplexing (OFDM) symbol.

Optionally, the response signaling is indicated by at least one of:

the response signaling being implicitly indicated by a downlink physical signal sequence, the response signaling being indicated by an information field in DCI,

the response signaling being implicitly indicated by scheduling DCI of a second step Msg2 in the four-step random access procedure initiated by the PRACH, or implicitly indicated by scheduling DCI of a second step MsgB in the two-step random access procedure initiated by the PRACH, the response signaling being indicated by an information field in the scheduling DCI of the second step Msg2 in the four-step random access procedure initiated by the PRACH, or indicated by an information field in the scheduling DCI of the second step MsgB in the two-step random access procedure initiated by the PRACH, the response signaling being implicitly indicated by a physical downlink shared channel (PDSCH) of a fourth step Msg4 in the four-step random access procedure initiated by the PRACH, or implicitly indicated by a PDSCH of the second step MsgB in the two-step random access procedure initiated by the PRACH, and the Msg4 or MsgB indicating that the random access is successful in contention, and the response signaling being indicated by an information field contained in the PDSCH of the fourth step Msg4 in the four-step random access procedure initiated by the PRACH, or indicated by an information field contained in the PDSCH of the second step MsgB in the two-step random access procedure initiated by the PRACH, and the Msg4 or MsgB indicating that the random access is successful in contention.

Optionally, the base station has multiple energy saving states, and the wake-up signaling is configured for requesting the base station to switch from the current energy saving state to another energy saving state or the non-energy saving state.

Optionally, if the UE determines that the base station is switched from the energy saving state to the non-energy saving state, the UE may perform at least one of:

initiating a random access procedure based on the available PRACH resource pool in the non-energy saving state of the base station, transmitting a scheduling request (SR) based on a preconfigured physical uplink control channel (PUCCH) resource, transmitting uplink data based on a preconfigured configured grant physical uplink shared channel (CG-PUSCH) resource, transmitting a sounding reference signal (SRS) based on a preconfigured periodic SRS or semi-persistent SRS, monitoring a PDCCH based on a preconfigured physical downlink control channel (PDCCH) search space, including monitoring a UE-specific search space and a type 3 search space, receiving a preconfigured semi-persistent scheduling PDSCH, or receiving a preconfigured periodic channel state information-reference signal (CSI-RS) or semi-persistent CSI-RS.

Optionally, the PRACH includes at least one of:

a PRACH of the first step MsgA in the two-step random access procedure, or a PRACH of the first step Msg1 in the four-step random access procedure.

Optionally, the transmitting a PRACH to the base station based on the available PRACH resources and the state of the base station includes in the energy saving state of the base station, initiating a random access procedure to the base station based on the trigger of a predetermined event, wherein the predetermined event includes at least one of:

uplink data arrives on a specific logical channel, in a radio resource control (RRC) connected state, uplink data arrives on the specific logical channel, and the downlink or uplink is out of synchronization, in the RRC connected state, uplink data arrives on the specific logical channel, and there is no available PUCCH resource for transmitting the SR, or in the RRC connected state, uplink data arrives on the specific logical channel, and the SR is failed, wherein the specific logical channel is a logical channel with a priority higher than a preset threshold.

Optionally, the transmitting a PRACH to the base station based on the available PRACH resources and the state of the base station includes determining, based on the state of the base station, whether the predetermined event may trigger the random access procedure, if the base station is in the non-energy saving state, determining that the predetermined event may trigger the random access procedure, if the base station is in the energy saving state, determining that the predetermined event may not trigger the random access procedure, wherein the predetermined event includes at least one of:

an initial access occurs in an RRC idle state, the RRC connection is reestablished, in the RRC connected state, uplink data arrives, and the uplink or downlink is out of synchronization, in the RRC connected state, uplink data arrives, and there is no available PUCCH resource for transmitting the SR, the SR is failed, the RRC synchronization reconfiguration is requested, an RRC inactive state is switched to an RRC connected state, timing alignment is established for a timing advance group (TAG), other system information (SI) is requested, or the beam failure is recovered.

In accordance with another aspect of the disclosure, a method performed by a base station in a communication system is provided. The method includes transmitting, to a UE, information related to PRACH resources, and monitoring corresponding available PRACH resources based on a state of the base station.

In accordance with another aspect of the disclosure, a user equipment is provided. The user equipment includes a transceiver, which is configured to transmit and receive signals, and a processor, which is coupled to the transceiver and configured to control to perform the method performed by a UE provided in the embodiments of the disclosure.

In accordance with another aspect of the disclosure, a base station is provided. The base station includes a transceiver, which is configured to transmit and receive signals, and a processor, which is coupled to the transceiver and configured to control to perform the method performed by a base station provided in the embodiments of the disclosure.

In accordance with another aspect of the disclosure, a non-transitory computer-readable storage medium is provided. The non-transitory computer-readable storage medium having computer programs stored thereon that, when executed by a processor, implement the method performed by a UE provided in the embodiments of the disclosure.

In accordance with another aspect of the disclosure, a non-transitory computer-readable storage medium is provided. The non-transitory computer-readable storage medium having computer programs stored thereon that, when executed by a processor, implement the method performed by a base station provided in the embodiments of the disclosure.

In accordance with another aspect of the disclosure, a computer program product is provided. The computer program product includes computer programs that, when executed by a processor, implement the method performed by a UE provided in the embodiments of the disclosure.

In accordance with another aspect of the disclosure, a computer program product is provided. The computer program product includes computer programs that, when executed by a processor, implement the method performed by a base station provided in the embodiments of the disclosure.

In accordance with the communication method, the user equipment, the base station and the storage medium provided in embodiments of the disclosure, the information related to PRACH resources is received, available PRACH resources in the energy saving state and/or non-energy saving state of the base station are determined, and a PRACH is transmitted to the base station based on the available PRACH resources and the state of the base station. Accordingly, the amount of PRACH resources to be monitored by the base station is reduced, and the purpose of saving power on the base station side is achieved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a schematic diagram of a PRACH configuration message according to an embodiment of the disclosure;

Throughout the drawings, it should be noted that like reference numbers are used to depict the same or similar elements, features, and structures.

DETAILED DESCRIPTION

Figure 1:
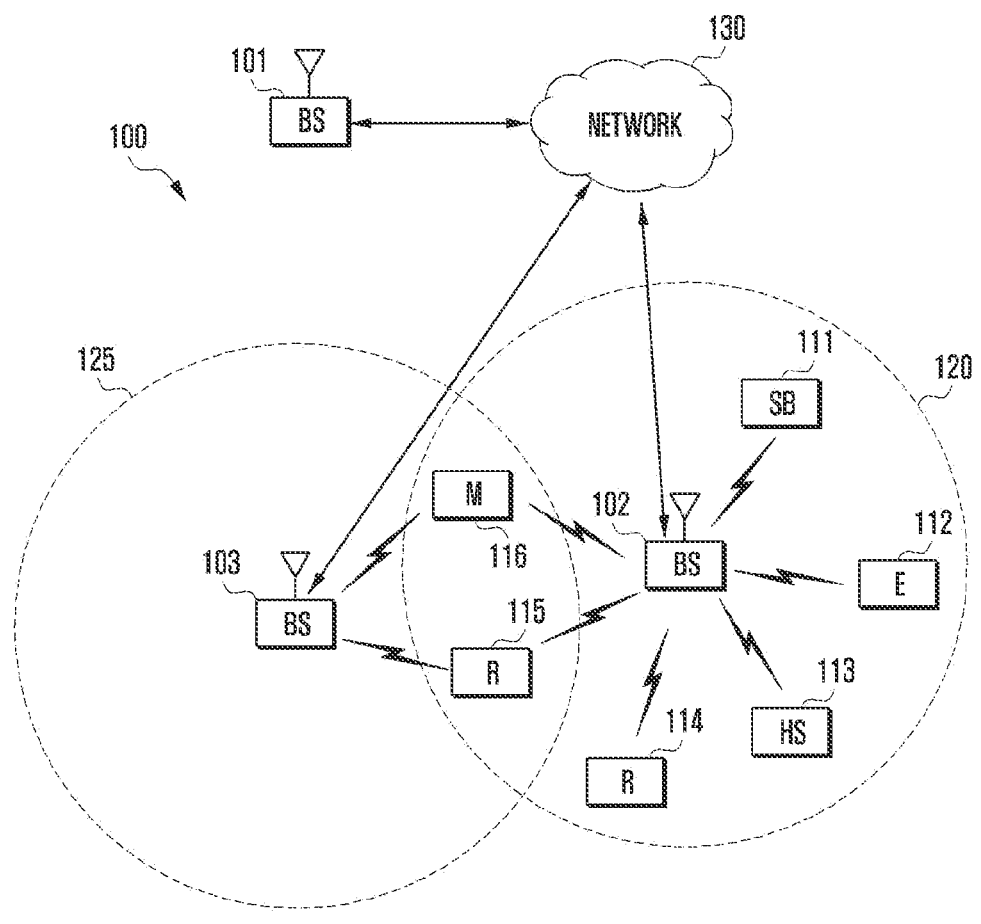
FIG. 1 is a schematic diagram of an overall structure of a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

To make the objects, the technical solutions and the advantages of embodiments of the disclosure more apparent, the technical solutions of the embodiments of the disclosure will be described in detail hereinafter in conjunction with the drawings of the embodiments of the disclosure.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

FIG. 1 illustrates an example wireless network 100 according to an embodiment of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), long term evolution advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
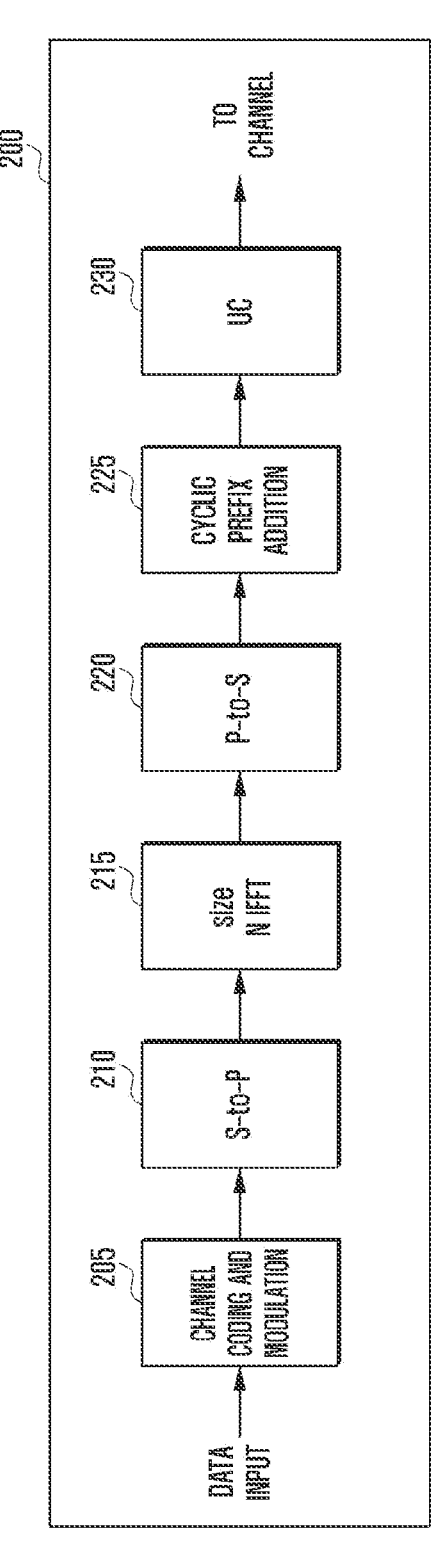
FIG. 2A is a schematic diagram of a transmitting path according to an embodiment of the disclosure.
Figure 2B:
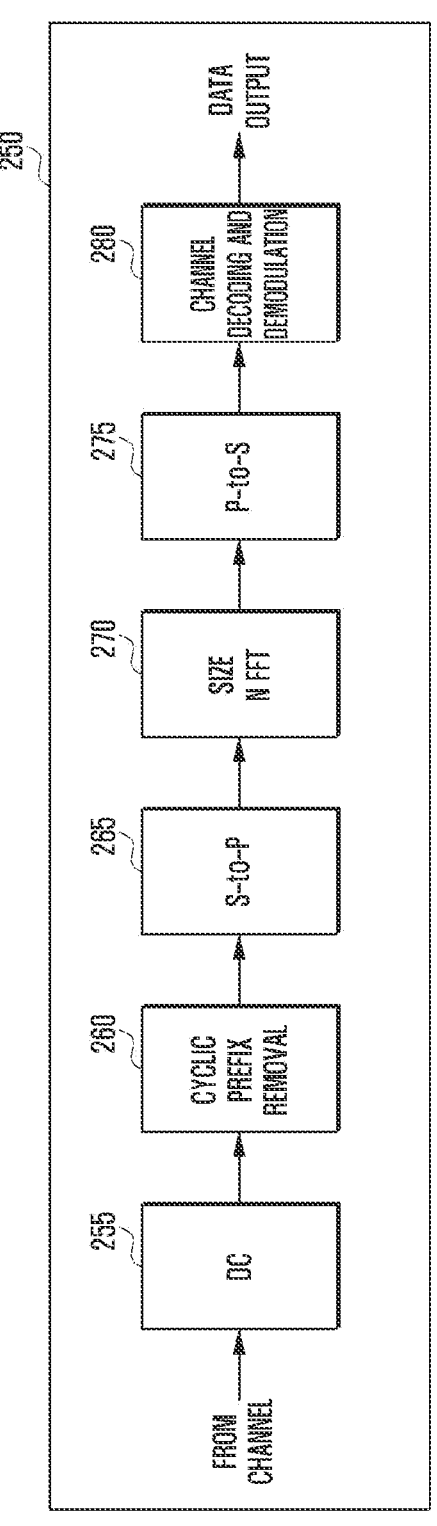
FIG. 2B is a schematic diagram of a receiving path according to an embodiment of the disclosure.

FIGS. 2A and 2B illustrate example wireless transmission and reception paths according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in various embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
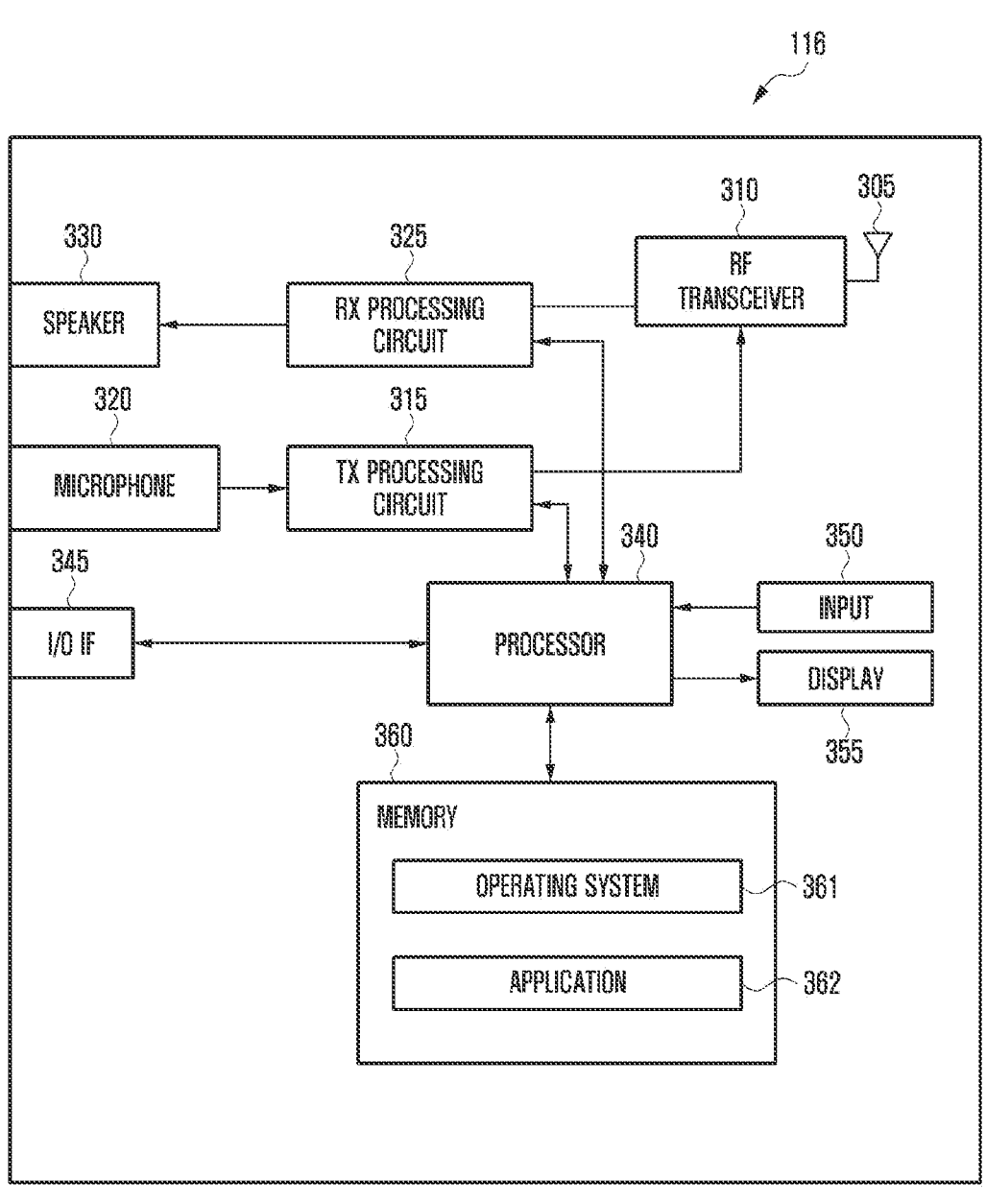
FIG. 3A is a schematic structure diagram of a UE according to an embodiment of the disclosure.

FIG. 3A illustrates an example UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
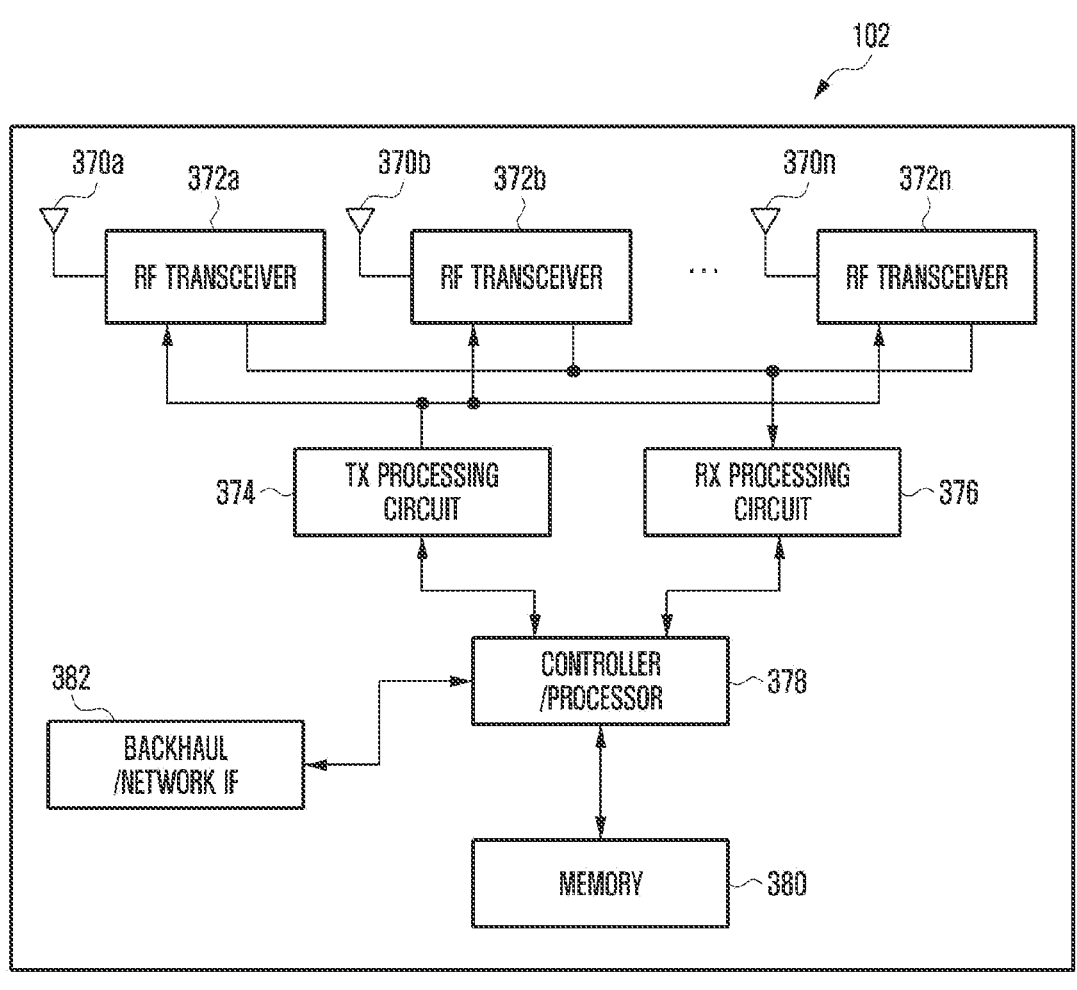
FIG. 3B is a schematic structure diagram of a base station according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In wireless mobile communication systems, terminal (UE) power saving has always been an important research direction. Actually, network power saving is also important, and the power consumption of mobile communication base stations accounts for about 60% to 70% of the operators' total power consumption. Therefore, how to reduce the power consumption of communication base stations is an urgent technical problem to be solved.

How to reduce the power consumption of communication base stations is of great significance for communication operators to achieve the purpose of energy saving and emission reduction. By reducing the power consumption of base stations, the calorific value of devices may be reduced, and the power consumption of corresponding air conditioners will also be reduced correspondingly, so that the electricity bill of operators is reduced. In the embodiments of the disclosure, the related methods of the power saving technology on the base station side are given from the perspective of reducing the proportion of physical random access channels.

The technical solutions in the embodiments of the disclosure and the technical effects achieved by the technical solutions in the disclosure will be explained below by describing several implementations. It is to be noted that the following implementations may refer to or learn from each other or be combined with each other, and the same terms, similar features and similar implementation steps in different implementations will not be repeated.

An embodiment of the disclosure provides a method performed by a UE.

Figure 4:
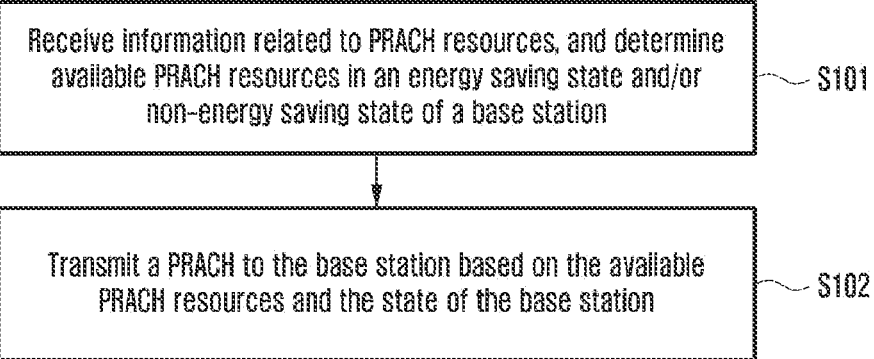
FIG. 4 is a flowchart of a method performed by a UE according to an embodiment of the disclosure.

FIG. 4 is a flowchart of a method performed by a UE according to an embodiment of the disclosure.

Referring to FIG. 4, the method includes the following actions.

In operation S101, information related to PRACH resources is received, and available PRACH resources in an energy saving state and/or non-energy saving state of a base station are determined.

In order to save power on the base station side, the most direct method is to introduce an energy saving state of the base station. In the energy saving state, the base station may not receive any uplink signal/channel and/or not transmit any downlink signal/channel, that is, the base station completely turns off the receiving device of the uplink and/or the transmitting device of the downlink; or, in the energy saving state, the base station only takes very little time to transmit some necessary signals/channels, for example, only transmitting specific downlink channels/signals and/or receiving specific uplink channels/signals. Since a large amount of transmitting and receiving operations are reduced, the base station may greatly reduce power consumption in the energy saving state. The state corresponding to the energy saving state of the base station may be referred to as a non-energy saving state of the base station. That is, the base station is in a normal operation mode. For example, the base station's behavior is not different from that in the existing system.

In embodiments of the disclosure, the energy saving state of the base station may also be referred to as the power saving state of the base station, the sleeping state of the base station, the OFF state of the base station, the non-active state of the base station, active time of the discontinuous transmission (DTX) of the base station, non-active time of the discontinuous reception (DRX) of the base station, etc. Correspondingly, the non-energy saving state of the base station may be referred to as the working state of the base station, the active state of the base station, the ON state of the base station, etc. The above different states of the base station may also be referred to as different modes of the base station.

In practical applications, if there is a small number of UEs served by a base station, the base station may transmit the data sets of these UEs within a period of time and then enter the energy saving state, so repeatedly. That is, the base station may be dynamically switched between the energy saving state and the non-energy saving state to realize power saving to the greatest extent.

In a wireless communication system, a base station configures cell-specific PRACH resources of which any UE in the cell may initiate a random access procedure (RACH process) on any PRACH resource.

In embodiments of the disclosure, considering that the base station will consume a certain amount of power to monitor each PRACH resource, when there is a small number of UEs served by the cell, the base station may mute part of PRACH resources, i.e., reducing the proportion of PRACH resources, thereby achieving the purpose of saving power on the base station side.

In embodiments of the disclosure, the PRACH resource being muted means that this PRACH resource may not be used by the UE, the UE may not initial a random access procedure on this PRACH resource, and the base station does not need to monitor this PRACH resource. The PRACH resource being muted may also be referred to as the PRACH resource being not available, the PRACH resource being off, the PRACH resource being disabled, or the PRACH resource being deactivated, etc. Correspondingly, the remaining part of PRACH resources is available, and other names may be deduced similarly and will not be repeated here.

In embodiments of the disclosure, regardless of the energy saving state or the non-energy saving state of the base station, the base station may indicate, to the UE, available part of PRACH resources and/or unavailable part of PRACH resources in one PRACH resource pool.

The UE may receive the information related to PRACH resources and then determine available PRACH resources in the energy saving state and/or non-energy saving state of the base station, i.e., PRACH resources that may be used by the UE. The UE may initiate random access on this part of PRACH resources, and the base station will monitor this part of PRACH resources.

The available PRACH resources in the energy saving state of the base station are not exactly the same as the available PRACH resources in the non-energy saving state of the base station.

In operation S102, a PRACH is transmitted to the base station based on the available PRACH resources and the state of the base station.

The PRACH includes at least one of the PRACH of the first step MsgA in the two-step random access procedure and the PRACH of the first step Msg1 in the four-step random access procedure.

In embodiments of the disclosure, it is very necessary for the UE to know whether the base station is in the energy saving state or the non-energy saving, so that unnecessary UE power consumption may be avoided. For example, many channels/signals may not be transmitted in the energy saving state of the base station, so it is unnecessary for the UE to receive/transmit these channels/signals.

Specifically, in the energy saving state of the base station, the UE in the RRC connected state may have at least one of the following restrictive behaviors.

It is expected to monitor PDCCHs. For example, it is expected to monitor all or some of Type 0 PDCCH common search space (CSS), Type0 A PDCCH CSS, Type1 PDCCH CSS, Type2 PDCCH CSS, Type3 PDCCH CSS and PDCCH USS. Or, it is expected to monitor a specific PDCCH search space. Or, it is expected to monitor a specific PDCCH search space group.

It is expected to receive preconfigured periodic CSI-CSs. For example, it is expected to receive all or some of periodic CSI-RS configurations. Correspondingly, it is also expected to report periodic measurements of these CSI-RSs.

It is expected to receive preconfigured periodic semi-persistent scheduling (SPS) PDSCHs. For example, it is expected to monitor all or some of SPS PDSCH configurations.

It is expected to transmit preconfigured periodic SRSs. For example, it is expected to transmit all or some of periodic SRS configurations.

It is expected to transmit preconfigured periodic configured grant PUSCHs, including Type 0 CG-PUSCHs and Type 1 CG-PUSCHs. For example, it is expected to transmit all or some of CG-PUSCH configurations.

It is expected to receive SSBs; or, for only the part of muted SSB resources, it is expected to receive SSBs.

It is expected to receive SIB1; or, for only the part of muted SIB1 cycles, it is expected to receive SIB1.

It is expected to monitor paging occasions (POs); or, for only the part of muted POs, it is expected to POs.

It is expected to transmit PRACHs; or, it is expected to transmit PRACHs on only the part of muted PRACH resources.

In addition, in the energy saving state of the base station, the UE in the RRC idle state and the UE in the RRC disconnected state may have at least one of the following restrictive behaviors.

It is expected to receive SSBs; or, for only the part of muted SSB resources, it is expected to receive SSBs.

It is expected to receive SIB1; or, for only the part of muted SIB1 cycles, it is expected to receive SIB 1.

It is expected to monitor POs; or, for only the part of muted POs, it is expected to POs.

It is expected to transmit PRACHs; or, it is expected to transmit PRACHs on only the part of muted PRACH resources.

In embodiments of the disclosure, the UE may receive the indication information related to the energy saving state of the base station. That is, the base station configures, to the UE, the indication information related to the energy saving state of the base station. Thus, the UE may determine, according to the indication information related to the energy saving state of the base station, whether the base station is in the energy saving state of the base station at a moment.

As an example, the UE may determine, according to the base station's indication through at least one of the following semi-static signaling and/or dynamic signaling, whether the base station is in the energy saving state, so as to determine whether the current predetermined behavior (e.g., transmitting PRACHs) of the UE is restricted.

1. The base station may broadcast the semi-static configuration of the energy saving state through system information. For example, the base station periodically enters the broadcast energy saving state, and lasts for a period of time. The duration may also be preconfigured.

2. The base station may indicate through a physical layer signaling that the base station is switched from the non-energy saving state to the energy saving state.

3. The base station may indicate through a physical layer signaling that the base station is switched from the energy saving state to the non-energy saving state.

4. The base station may indicate through a physical layer signaling whether the base station is switched from the non-energy saving state to the energy saving state at the preconfigured time point.

5. The base station may indicate through a physical layer signaling whether the base station is switched from the energy saving state to the non-energy saving state at the preconfigured time point.

6. The base station may indicate through a physical layer signaling that the base station is switched from the non-energy saving state to the energy saving state and lasts for a period of time.

7. The base station may indicate through a physical layer signaling that the base station is switched from the energy saving state to the non-energy saving state and lasts for a period of time.

The dynamic signaling may match the service of the UE in the cell more dynamically.

Optionally, the physical layer signaling may be UE group DCI, but it is not limited thereto. For example, the physical layer signaling may also be a medium access control (MAC) control element (CE), a physical layer signal sequence, etc.

In embodiments of the disclosure, the UE transmits a PRACH to the base station based on the available PRACH resources corresponding to the state of the base station. For the base station, it only needs to monitor this part of PRACH resources, instead of monitoring all PRACH resources.

Therefore, the method performed by a UE provided in embodiments of the disclosure may reduce the amount of PRACH resources to be monitored by the base station, thereby achieving the purpose of saving power on the base station side.

The method performed by a UE provided in embodiments of the disclosure is applicable to PRACHs in both the two-step random access procedure and the four-step random access procedure.

In embodiments of the disclosure, feasible implementations are provided for the operation S101, specifically including at least one of the following ways.

Way 1: First information configured for indicating available part of PRACH resources and/or unavailable part of PRACH resources in a first PRACH resource pool in the energy saving state of the base station is received, and available PRACH resources in the energy saving state of the base station are determined according to the first information.

The PRACH resource pool refers to a set of PRACH resources.

All PRACH resources in the first PRACH pool are available in the non-energy saving state of the base station.

Part of PRACH resources in the first PRACH resource pool are still available or unavailable in the energy saving state of the base station. For example, the base station indicates to the UE that part of PRACH resources in the first PRACH resource pool are available or unavailable. If part of PRACH resources are indicated to be unavailable in the energy saving state of the base station, it indicates that the remaining PRACH resources are available in the energy saving state of the base station; and, if some PRACH resources are indicated to be available in the energy saving state of the base station, it indicates that the remaining PRACH resources are unavailable in the energy saving state of the base station.

In embodiments of the disclosure, if the UE determines that the base station is in the energy saving state, the current available PRACH resources may be determined according to the first information.

In embodiments of the disclosure, the first PRACH resource pool may be a cell-specific PRACH resource pool. That is, the first PRACH resource pool is configured through a random access channel common configuration information element (RACH-ConfigCommon, a parameter in SIB1). For example, the first PRACH resource pool may include PRACH resources in a preamble group A (Group A) and PRACH resources in a preamble group B (Group B).

Way 2: Second information configured for configuring a second PRACH resource pool is received, and corresponding available PRACH resources are determined according to the second information and the state of the base station, the second PRACH resource pool is used only in the energy saving state of the base station or the non-energy saving state of the base station.

In embodiments of the disclosure, in addition to the existing cell-specific PRACH resources configured through the cell system information (the first PRACH resource pool), the base station additionally configures a group of PRACH resources for used in the energy saving state of the base station (the second PRACH resource pool). For example, the PRACH resources determined according to RACH-Config-Common may not be used in the energy saving state of the base station, and only the group of additionally configured PRACH resources may be used in the energy saving state of the base station. The UE first determines, according to the related configuration information of the energy saving state of the base station, whether it is in the energy saving state of the base station, and then determine available PRACH resources.

For example, the first PRACH resource pool is only used in the non-energy saving state of the base station, and the additionally configured second PRACH resource pool is only used in the energy saving state of the base station. If it is determined that the state of the base station is the energy saving state, the current available PRACH resources are determined as all PRACH resources in the second PRACH resource pool; and, if it is determined that the state of the base station is the non-energy saving state, the current available PRACH resources are determined as all PRACH resources in the first PRACH resource pool.

For another example, the first PRACH resource pool is used in the non-energy saving state of the base station and the energy saving state of the base station, and the additionally configured second PRACH resource pool is only use in the non-energy saving state of the base station. If it is determined that the state of the base station is the non-energy saving state, the current available PRACH resources are determined all PRACH resources in the first PRACH resource pool and the second PRACH resource pool; and, if it is determined that the state of the base station is the energy saving state, the current available PRACH resources are determined as all PRACH resources in the first PRACH resource pool.

In embodiments of the disclosure, the first PRACH resource pool is different from the second PRACH resource pool. Optionally, the first PRACH resource pool is configured according to a legacy version of information elements, and the second PRACH resource pool is configured according to a new version of information elements. However, it is not limited thereto.

In other embodiments, the first PRACH resource pool may be configured for a specific version of UEs. For example, the base statin may configure PRACH resources special for a Rel-18 version of UEs. In other words, the PRACH resource pool used by a previous version of UEs before the Rel-18 version is different. Thus, it is advantageous to avoid affecting legacy UEs.

In embodiments of the disclosure, the first information and/or the second information is indicated by at least one of the following signaling.

1. SIB. That is, the information of available and/or unavailable part of PRACH resources is indicated in the system information. The configuration information is semi-static, that is, it may remain unchanged for a long time. For example, the base station indicates the information of the PRACH resources muted within a period of time, and the PRACH resources muted within this period of time are repetitive in a certain period. The period of the muted PRACH resources and the length of the time window where the muted PRACH resources are located may be a same value, or be configured separately. Similarly, the information of the second PRACH resource pool that is only used in the energy saving state of the base station or the non-energy saving state of the base station may be indicated in the system information.

2. PBCH. That is, the information of the available or unavailable part of PRACH resources is indicated by a PBCH. For example, the indication of the muted PRACH resources may be only limited to the current system information modification period. In a next system information modification period, the UE needs to receive the latest PBCH to determine the muted PRACH resources. Similarly, the information of the second PRACH resource pool that is only used in the energy saving state of the base station or the non-energy saving state of the base station may be indicated in the PBCH.

3. DCI. That is, the information of the available or unavailable part of PRACH resources is indicated by DCI. For example, the DCI indicates the information of the part of muted PRACH resources in the current radio frame or a next radio frame. The DCI may be cell-specific (that is, all UEs in the cell monitors the same DCI) or UE-group-specific (that is, a group of UEs monitors the same DCI). Similarly, the information of the second PRACH resource pool that is only used in the energy saving state of the base station or the non-energy saving state of the base station may be indicated in the DCI.

In the existing NR systems, the concept of beam is used for high frequency deployment to improve cell coverage. There are multiple transmission occasions for SSB within a time-domain period, and SSBs of the multiple transmission occasions form a SSB set. The SSB has respective index, and may correspond to different beams (mainly analog beams), respectively. Different beams are transmitted through beam sweeping at multiple occasions to cover different directions of the whole cell. For example, if there are N beams pointing to different directions in a cell, there may be N SSBs actually transmitted in an SSB set cycle, and each SSB corresponds to a different beam and points to a different direction at a different occasion for SSB transmission. In the random access procedure, there is an association between PRACHs and SSB, so that the base station may know the best downlink beam (i.e., the SSB beam associated with the PRACH) through the PRACH, thus avoiding beam sweeping of Msg2 (corresponding to the second step in the four-step random access procedure) or MsgB (corresponding to the second step in the two-step random access procedure), and improving transmission efficiency. The UE determines the best downlink beam (i.e., the SSB beams with the highest measurement value) in the SSB according to the SSB measurement, and transmits a PRACH associated with the best SSB beam.

There may be a one-to-multiple, one-to-one or multiple-to-one association between the SSBs and the PRACHs, depending upon the parameter ssb-perRACH-OccasionAndCB-PreamblesPerSSB in the PRACH configuration message.

FIG. 5 is a schematic diagram of a PRACH configuration message according to an embodiment of the disclosure.

For example, referring to the TS38.331 configuration shown in FIG. 5, if the configuration value of this parameter is M, one SSB is associated with 1/M ROs, where the value range of M is $\{1/8, 1/4, 1/2, 1, 2, 4, 8, 16\}$. One RO refers to a PRACH time-frequency domain resource, and there may be available preambles on one RO. For some M values (M values less than or equal to 2), this parameter additionally indicates the number of preambles available for contention access on one RO (it is assumed as R). For example, if M=1/4, 1 SSB is associated with 4 ROs, and the indexes of preambles available for contention access on each RO are 0 to (R−1); if M=2, 1 SSB is associated with 1/2 ROs, that is, 2 SSBs are associated with 1 RO, where the indexes of preambles available for contention access on the first SSB are 0 to (R−1), and the indexes of preambles available for contention access on the second SSB are R to (2*R−1); and, if M=4, 4 SSBs are associated with 1 RO, the number of preambles available for contention access on each SSB is totalNumberOfRA-Preambles/M, and the indexes of preambles corresponding to the $i^{th}$ (0≤i<M) SSB are i*totalNumberOfRA-Preambles/M to (i+1)*totalNumberOfRA-Preambles/M−1, respectively.

In embodiments of the disclosure, the PRACH resources include ROs, and the first information indicates available part of ROs and/or unavailable part of ROs in the first PRACH resource pool through at least one of the following indication granularities. That is, the following indication granularities may be combined in various ways.

1. All ROs in Multiple PRACH Cycles

Optionally, the indication granularity is a group of continuous PRACH cycles, that is, all ROs in a group of continuous PRACH cycles are indicated to be available or unavailable. For example, the base station indicates the related information of time-domain positions of a group of muted continuous PRACH cycles.

2. All ROs in One Association Cycle, the Association Cycle being an Association Cycle Between PRACHs and SSBs For example, the configuration cycle of PRACH is 10 ms, and the PRACH and the SSB are associated based on the preconfigured association parameter sb-perRACH-OccasionAndCB-PreamblesPerSSB-forRemainingRO. If 4 PRACH cycles are required to associate all SSBs in an SSB burst set with corresponding PRACH resources, the association cycle of the SSB and the PRACH is 40 ms. By using 40 ms as the indication granularity, the base station indicates the specific position of the 40 ms association cycle in which the PRACH is muted.

3. All ROs in One PRACH Cycle

That is, all ROs in one PRACH cycle are indicated to be available or unavailable. For example, the base station indicates the related information of the time-domain position of the muted PRACH cycle.

4. A Group of ROs

That is, all ROs in a group of ROs are indicated to be available or unavailable. For example, ROs are grouped based on the predefined rule, and each group of ROs is numbered. The base station indicates the related information of the serial number of the group of muted ROs.

5. All ROs Associated with One SSB Index

Optionally, a group of ROs is all ROs associated with a same SSB. If 1 SSB is associated with X ROs, the X ROs are a group of ROs.

6. All ROs Associated with One SSB Burst Set

Optionally, a group of ROs is all ROs associated with all actually transmitted SSBs in a same SSB set cycle. If there are Y SSBs in an SSB set cycle and if 1 SSB is associated with Z ROs, all ROs associated with one SSB set cycle are Y*Z ROs.

7. All ROs in One Time Slot

That is, all ROs in one time slot are indicated to be available or unavailable. For example, the base station indicates the related information of the time-domain position of the muted RO.

8. All ROs on One Time-Domain Resource

That is, all frequency-domain ROs in one time-domain RO are indicated to be available or unavailable. For example, the base station indicates the related information of the time-domain position of the muted time-domain RO.

9. One RO

That is, all contention access based preambles of one RO associated with the SSB are indicated to be available or unavailable. For example, the base station indicates the related information of the RO serial number of the muted RO in the current PRACH cycle; or, in a PRACH cycle, each RO is numbered based on the time-domain and frequency-domain positions, and the base station indicates the related information of the time-frequency domain position of the muted RO.

In embodiments of the disclosure, the RO being available means that all or some of configured PRACH preambles on the RO are available, the RO being unavailable means that all or some of configured PRACH preambles on the RO are unavailable, and part of PRACH preambles are predefined or preconfigured.

Optionally, the base station may divide preambles into groups, and then indicate available or unavailable part of all contention access based preambles associated with the SSB on one RO.

In embodiments of the disclosure, the above "one" or "a group" is only exemplary and should not be interpreted as limitations to the disclosure. In practical applications, the corresponding indication granularity may also include "two" or "more than two", "two group" or "more than two groups".

In embodiments of the disclosure, the first information indicates available part of PRACH resources and/or unavailable part of PRACH resources in the first PRACH resource pool through at least one of the following indication granularities.

1. All PRACH Resources Associated with One SSB Index

That is, all PRACH resources associated with one SSB are indicated to be available or unavailable.

2. All PRACH Resources Associated with One SSB Burst Set

That is, all PRACH resources associated with all actually transmitted SSBs in a same SSB set cycle are indicated to be available or unavailable.

Similarly, the above "one" is only exemplary and should not be interpreted as limitations to the disclosure. In practical applications, the corresponding indication granularity may also include "two" or "more than two".

In embodiments of the disclosure, the first information may also be indicated by a bit map, wherein each bit in the bit map indicates that the RO or PRACH resource corresponding to the indication granularity (at least one of the above indication granularities) is available or unavailable. For example, each bit corresponds to the PRACH resource in the indication granularity. The indication value "0" indicates that the corresponding PRACH resource is unavailable, and the indication value "1" indicates that the corresponding PRACH resource is available. Thus, the information of the part of muted PRACH resources within a period of time may be indicated by the bit map.

In embodiments of the disclosure, part of PRACH resources in the first PRACH resource pool being indicated to be available or unavailable in the energy saving state of the base station will have an impact on UEs of the legacy system. Since the UEs of the legacy system may not acquire any indication information of the new system, that is, since the UEs may not know the energy saving state of the base station and the indication information of PRACH resource muting, in the energy saving state of the base station, these UEs will consider that all PRACH resources in the first PRACH resource are available. When these UEs initiate the random access procedure on some muted PRACH resources, the base station may not respond to these UEs, thus significantly affecting the access delay of the UEs. In order to avoid the energy saving technology of the base station from affecting the UEs of the legacy system, the network may bar the UEs of the legacy system from staying in the cell with a base station energy saving function through the cell barring indication information (uac-BarringInfo) in the SIB1, and introduce new indication information into the SIB1 to permit UEs of the new system to stay in the cell with the base station energy saving function.

In embodiments of the disclosure, part of PRACH resources in the first PRACH resource pool being indicated to be available or unavailable in the energy saving state of the base station further includes the following: the association between available part of PRACH resources in the first PRACH resource pool and SSBs in the energy saving state of the base station, i.e., the association between the remaining available part of PRACH resources and SSBs when part of PRACH resources in one PRACH resource pool are indicated to be unavailable in the energy saving state of the base station or the association between the available part of PRACH resources and SSBs when part of PRACH resources in one PRACH resource pool are indicated to be available in the energy saving state of the base station, may apply any one of the following ways.

1. Association the Same as that in the Non-Energy Saving State of the Base Station That is, the association between the available part of PRACH resources and SSBs is not changed. The association between the available part of PRACH resources and SSBs is not related to whether part of PRACH resources in the first PRACH resource pool is muted, and the association between PRACH resources and SSBs remains unchanged. In other words, the association between PRACH resources and SSBs is not related to whether the base station is in the energy saving state. No matter the base station is in the energy saving state or the non-energy saving state, the PRACH resources are associated to a same SSB index.

2. Association Different from that in the Non-Energy Saving State of the Base Station That is, the association between the available part of PRACH resources and SSBs may be changed. The association between the available part of PRACH resources and SSBs is related to whether part of PRACH resources in the first PRACH resource pool is muted. If part of PRACH resources is muted, the remaining available part of ROs in an association period is numbered, and these ROs are re-associated with SSBs. In other words, the association between PRACH resources and SSBs is related to whether the base station is in the energy saving state. In the non-energy saving state of the base station, the PRACH resources are associated to an SSB index; while in the energy saving state of the base station, the PRACH resources may be associated to another SSB index.

Optionally, in the energy saving state of the base station, the available part of ROs may be renumbered. Based on association parameters the same as those in the non-energy saving state of the base station, the available part of PRACH resources in the first PRACH resource pool is re-associated with SSBs. That is, these ROs are re-associated with SSBs based on the parameter ssb-perRACH-OccasionAndCB-PreamblesPerSSB the same as that in the non-energy saving state of the base station.

Optionally, in the energy saving state of the base station, the available part of ROs may be renumbered. Based on association parameters different from those in the non-energy saving state of the base station, the available part of PRACH resources in the first PRACH resource pool is re-associated with SSBs. That is, these ROs are re-associated with SSBs based on the parameter ssb-perRACH-OccasionAndCB-PreamblesPerSSB different from that in the non-energy saving state of the base station.

Optionally, in the energy saving state of the base station, the available part of PRACH resources is re-associated with SSBs based on a legacy version of association parameters, that is, these ROs are re-associated with SSBs based on the existing parameter ssb-perRACH-OccasionAndCB-PreamblesPerSSB.

Or, in the energy saving state of the base station, based on a new version of association parameters, i.e., based on the newly introduced parameter (e.g., ssb-perRACH-OccasionAndCB-PreamblesPerSSB-forRemainingRO), the available part of PRACH resources is re-associated with SSBs. This newly introduced parameter has the same physical meaning as the existing parameter, and is only used for determining the association between the available part of PRACH resources and SSBs in the energy saving state of the base station.

In embodiments of the disclosure, one PRACH resource may refer to one RO, or one preamble on one RO.

In embodiments of the disclosure, if the base station is in the energy state for a long time and when uplink data arrives on the UE, the delay will be increased since the uplink data of the UE may not be scheduled by the base station, and the user experience will be greatly affected. Therefore, in the energy saving state, the base station may regularly monitor the random access channel or wake-up signaling transmitted by the UE, where the wake-up signaling may be, but not limited to, a wake-up signal (WUS). Here, the wake-up signaling is transmitted to the base station by the UE, and is configured for waking up the base station from the energy saving state, i.e., requesting the base station to switch from the energy saving state to the non-energy saving state, so as to provide data transmission services to the UE as soon as possible.

If the base station has monitored the wake-up signaling transmitted by the UE, it indicates that the UE needs to transmit uplink data, then the base station may be switched from the energy saving state to the non-energy saving state. In view of energy saving, the wake-up signaling may be carried by a physical signal sequence to reduce the received power consumption on the base station side. In order to reduce the impact on the standard, the wake-up may reuse the uplink physical signal sequence in the existing system. For example, the wake-up signaling is carried in the existing PUCCH format 0 or PUCCH format 1; or, the wake-up signaling is carried by a PRACH. That is, in embodiments of the disclosure, the PRACH has a function of waking up the base station.

In embodiments of the disclosure, if the wake-up signaling for waking up the base station is carried by a PRACH, the base station regularly monitors the PRACH in the energy saving state. Specifically, the operation S102 may specifically include: in the energy saving state of the base station, transmitting a PRACH to the base station based on the available PRACH resources, the PRACH or the random access procedure initiated by the PRACH indicating a wake-up signaling, the wake-up signaling is configured for requesting the base station to switch from the energy saving state to the non-energy saving state.

In one optional implantation, the PRACH or the random access procedure initiated by the PRACH indicating the wake-up signaling may include: implicitly indicating the wake-up signaling through a PRACH.

Optionally, the PRACH has no random access function. That is, the PRACH here is different from conventional PRACHs. The PRACH here has no random access function, and the PRACH here has only the function of waking up the base station. To distinguish this PRACH from the conventional PRACHs, this PRACH is called WUS-PRACH hereinafter. In practical disclosures, this PRACH is not limited to this name and may also be called after other names.

The WUS-PRACH resource may be part of PRACH resources in the existing cell-specific PRACH resource pool (i.e., the first PRACH resource pool). For example, the WUS-PRACH resource may be the available part of PRACH resources in the first PRACH resource pool in the energy saving state determined in the above way 1. The specific determination way may refer to the above description, and will not be repeated here.

Or, the WUS-PRACH resource may be specially configured by the base station (e.g., the second PRACH resource pool, but it is not limited thereto). That is, the WUS-PRACH may apply a new configuration mode. For example, there is no need to configure the WUS-PRACH resource based on the existing PRACH configuration table. The base station may directly indicate the period, time-domain position, frequency-domain position and/or preamble index number of the WUS-PRACH, where the period and time-domain position of the WUS-PRACH may be jointly indicated. There may be only one WUS-PRACH transmission occasion in one WUS-PRACH period, and the WUS-PRACH may only use one preamble. This is because the WUS-PRACH has no random access function and all UEs may share a same WUS-PRACH resource and a same preamble. In other words, multiple UEs may transmit a same preamble on a same WU-PRACH resource. Since there is no competition among these UEs, transmitting the WUS-PRACH by these UEs is to wake up the base station. By superposing the signals of these UEs, the base station's capability to monitor the WUS-PRACH may be improved, and the base station does not need to distinguish which UEs transmit the WUS-PRACH.

Optionally, the PRACH has a random access function, and also has a function of waking up the base station. The request to wake up the base station may be implicitly indicated to the base station through a PRACH. For example, if the request to wake up the base station is carried by the PRACH of the first step in the random access procedure, i.e., the PRACH of Msg1 (corresponding to the four-step random access procedure) or the PRACH of MsgA (corresponding to the two-step random access procedure), in addition to responding to the random access procedure initiated by the PRACH, the base station also determine, according to the request to wake up base station, whether to switch from the energy saving state to the non-energy saving state of the base station.

In embodiments of the disclosure, in a case where the PRACH implicitly indicates a wake-up signal, after transmitting the PRACH to the base station, the method may further include: determining, in a first time unit after a first preset interval starting from transmitting the PRACH (e.g., WUS-PRACH), that the base station is switched from the energy saving sate to the non-energy saving state.

The time unit is a sub-frame, a time slot or an OFDM symbol.

That is, in embodiments of the disclosure, after transmitting the PRACH, the UE may assume (determine) that the base station is switched from the energy saving state to the non-energy saving state at a certain moment, without the confirmation of the base station. For example, after the UE transmits the PRACH to wake up the base station, the UE determines that the base station is switched from the energy saving state to the non-energy saving state in a first time slot or first symbol after the first preset interval starting from transmitting the PRACH. The size of the first preset interval may be predefined or preconfigured.

Since the WUS-PRACH does not need to be confirmed by the base station, the WUS-PRACH transmitted by the UE does not need to carry beam information. That is, unlike the conventional PRACH, the WUS-PRACH does not need to be associated with the SSB. The UE directly selects the nearest WUS-PRACH resource, without need for selecting the corresponding WUS-PRACH resource according to the SSB measurement result.

For the PRACH with the random access function, no matter whether the UE monitors the corresponding Msg2 (corresponding to the four-step random access procedure) or MsgB (corresponding to the two-step random access procedure) after transmitting the Msg1 or MsgA and no manner whether the random access procedure corresponding to this PRACH is successful in contention, the UE assumes that the base station is switched from the energy saving state to the non-energy saving state in the first time slot or first symbol after the first preset interval starting from Msg1 or MsgA.

In embodiments of the disclosure, in a case where the PRACH implicitly indicates a wake-up signal, after transmitting the PRACH to the base station, the method may further include: monitoring a response signaling of the base station after a second preset interval starting from transmitting the PRACH (e.g., WUS-PRACH), and if the response signaling indicates that the base station is switched from the energy saving state to the non-energy saving state, determining, in a first time unit after a third preset interval starting from the response signaling, that the base station is switched from the energy saving state to the non-energy saving state.

The time unit is a sub-frame, a time slot or an OFDM symbol.

That is, in embodiments of the disclosure, after transmitting the PRACH, the UE monitors the response signal of the base station, where the response signal may include an acknowledge (ACK) signal or a negative acknowledge (NACK) signal, but it is not limited thereto. If the UE has monitored the response signal of the base station, it may be determined that the base station is switched from the energy saving state to the non-energy saving state at a certain moment. For example, after the UE transmits the PRACH to wake up the base station, the UE starts to monitor the response signaling of the base station after the second preset interval starting from the PRACH. If the UE has monitored the response signaling, it is determined that the base station is switched from the energy saving state to the non-energy saving state in the first time slot or first symbol after the third preset interval starting from the response signal received by the UE; or, it is determined that the base station is switched from the energy saving state to the non-energy saving state in the first time slot or first symbol after the third preset interval starting from the ending position of the monitoring window of the response signaling. If the UE has not monitored the response signaling, it should be determined that the base station is not woken up.

In embodiments of the disclosure, the size of the second preset interval and the size of the third preset interval may be predefined or preconfigured.

In embodiments of the disclosure, the response signaling is indicated by at least one of the following signaling.

1. The response signaling is implicitly indicated by a downlink physical signal sequence.

For example, if the UE has monitored the predefined physical signal sequence, it is determined that the base station is switched from the energy saving state to the non-energy saving state; otherwise, it is determined that the base station is still in the energy saving state. The response signaling may be a newly defined downlink physical signal sequence or reuse the existing downlink physical signal sequence, e.g., primary synchronization signal (PSS), secondary synchronization signal, SCI-RS, etc.

2. The response signaling is explicitly indicated by DCI.

That is, the response signaling is indicated by an information field in DCI.

In embodiments of the disclosure, the DCI for carrying the response signaling may reuse the search space of the existing random access procedure, i.e., Type1 PDCCH CSS configured according to the parameter ra-SearchSpace. The DCI may also be scrambled by RA-RNTI, etc.

Further, the DCI may use a new DCI format. This new DCI format at least includes a 1-bit ACK or NACK indication field. The indication value "1" indicates that the base station is woken up, and the indication value "0" indicates that the base station refuses to be woken up. In this case, the UE may not wake up the base station through the PRACH again, or the UE will at least wait for a period of time before transmitting the PRACH on a next available PRACH resource to try to wake up the base station again.

In addition, this DCI format may further include the related information indicating the specific time point when the base station is switched from the energy saving state to the non-energy saving state, and/or may further include the related information indicating the duration in which the base station is switched from the energy saving state to the non-energy saving state, etc.

Or, the response signaling is indicated by the information field in the scheduling DCI of the second step Msg2 in the four-step random access procedure initiated by the PRACH, or indicated by the information field in the scheduling DCI of the second step MsgB in the two-step random access procedure initiated by the PRACH.

3. The Response Signaling is Implicitly Indicated by DCI.

Specifically, the response signaling is implicitly indicated by the scheduling DCI of the second step Msg2 in the four-step random access procedure initiated by the PRACH, or implicitly indicated by the scheduling DCI of the second step MsgB in the two-step random access procedure initiated by the PRACH. That is, if the UE has monitored the scheduling DCI of the Msg2 or MsgB, it is determined that the base station is switched from the energy saving state to the non-energy saving state; otherwise, it is determined that the base station is still in the energy saving state.

4. The Response Signaling is Implicitly Indicated by a PDSCH.

Specifically, the response signaling is implicitly indicated by the PDSCH of the fourth step Msg4 in the four-step random access procedure initiated by the PRACH, or implicitly indicated by the PDSCH of the second step MsgB in the two-step random access procedure initiated by the PRACH, and the Msg4 or MsgB indicates that the random access is successful in contention. That is, if the UE has received the PDSCH of the Msg4 or the PDSCG of MsgB that indicates the random access is successful in contention, it is determined that the base station is switched from the energy saving state to the non-energy saving state; otherwise, it is determined that the base station is still in the energy saving state.

5. The Response Signaling is Explicitly Indicated by a PDSCH.

That is, the response signaling is indicated by the information field contained in the PDSCH. Specifically, the response signaling is indicated by the information field contained in the PDSCH of the fourth step Msg4 in the four-step random access procedure initiated by the PRACH, or indicated by the information field contained in the PDSCH of the second step MsgB in the two-step random access procedure initiated by the PRACH, and the Msg4 or MsgB indicates that the random access is successful in contention.

In embodiments of the disclosure, if the UE has not monitored the response signaling (e.g., physical signal sequence or DCI) transmitted by the base station, the UE may continuously transmit a wake-up signaling on a next available PRACH resource to try to wake up the base station.

In embodiments of the disclosure, for the WUS-PRACH, although the UE needs to make a confirmation by using the response from the base station, the WUS-PRACH transmitted by the UE may still carry no beam information. That is, unlike conventional PRACHs, the WUS-PRACH does not need to be associated with the SSB, and the UE directly selects the nearest WUS-PRACH resource without need for selecting the corresponding WUS-PRACH resource according to the SSB measurement result. After the base station has monitored the WUS-PRACH, since the best downlink beam of the UE for transmitting the WUS-PRACH may not be determined, the base station may perform beam sweeping on the response signaling of the WUS-PRACH in different directions at different moments. Correspondingly, the UE monitors the response signaling of the WUS-PRACH in a monitoring window. Only when the response signaling is monitored, the UE may stop monitoring.

In combination with at least one of the above embodiments, in embodiments of the disclosure, for the PRACH with the random access function, after the UE transmits the Msg1 or MsgA, if the UE has monitored, on the Type 1 PDCCH CSS, the PDCCH scrambled by the RA-RNTI or MsgB-RNTI, the UE assumes that the base station is woken up successfully. For example, the UE assumes that the base station is switched from the energy saving state to the non-energy saving state in the first time slot or first symbol after the predetermined interval starting from the PDCCH; or, the base station explicitly indicates through the Msg2 or MsgB that the base station is woken up. For example, the indication is realized by one DCI field in the PDCCH of Msg2 or MsgB, or the indication is realized by the MAC CE carried by the PDSCH of Msg2 or MsgB. If the UE has received the Msg2 or MsgB and the Msg2 or MsgB indicates that the base station is woken up successfully, the UE assumes that the base station is switched from the energy saving state to the non-energy saving state in the first time slot or first symbol after the predetermined interval starting from Msg2 or MsgB; or, if the random access procedure initiated by the UE is successful in contention, that is, if the information indicating that the contention is resolved in the Msg4 or MsgB has received, the UE assumes that the base station is woken up successfully. For example, the UE assumes that the base station is switched from the energy saving state to the non-energy saving state in the first time slot or first symbol after the predetermined interval starting from Msg4 or MsgB.

In embodiments of the disclosure, if the UE determines that the base station is switched from the energy saving state to the non-energy saving state, various configured resources for the non-energy saving state may be used. For example, if the random access procedure initiated by the UE is not successfully in contention, since the PRACH implicitly carries the function of requesting to wake up the base station, the UE may initiate the contention-based random access procedure based on the available PRACH resources in the non-energy saving state of the base station once the UE determines that the base station is switched from the energy saving state to the non-energy saving state.

In another optional implementation, the PRACH or the random access procedure initiated by the PRACH indicating the wake-up signaling may include: explicitly indicating the wake-up signaling through the PUSCH of the third step Msg3 in the four-step random access procedure initiated by the PRACH, or explicitly indicating the wake-up signaling through the PUSCH of the first step MsgA in the two-step random access procedure initiated by the PRACH.

In embodiments of the disclosure, the wake-up signaling may be explicitly indicated to the base station through the random access procedure. Specifically, in the four-step random access procedure, the UE may request to wake up the base station by carrying the wake-up signaling through Msg3. For example, it is indicated by the RACH reason of Msg3 that the purpose of initiating the random access procedure is to request to wake up the base station; or, the base station is requested to wake up through an MAC CE contained in the Msg3. Similarly, in the two-step random access procedure, the UE may also request to wake up the base station by carrying the wake-up signaling through the PUSCH of MsgA.

In embodiments of the disclosure, in order to more flexibly realize base station energy saving to different degrees, it is also possible to define two or more energy saving states of the base station, and the behavior restriction range of the base station is different in different energy saving states. Correspondingly, the UE's behavior is also different. The base station may indicate to the UE that the base station is in which energy state of the base station. For example, the UE's behaviors in two energy saving states of the base station may be specified, respectively. By taking the deep energy saving state of the base station and the light energy saving state of the base station as an example, the UE's behavior is less restricted in the light energy saving state of the base station, compared with the deep energy saving state of the base station.

In embodiments of the disclosure, if the base station has various energy saving states and the UE may further request the base station to switch to which state, the wake-up signaling is configured for requesting the base station to switch from the current energy saving state to another energy saving state or the non-energy saving state. For example, the base station is requested from the deep energy saving state to the light energy saving state. Optionally, the wake-up signal is the wake-up signal indicated by the PUSCH of the third step Msg3 in the four-step random access procedure initiated by the PRACH or the wake-up signal indicated by the PUSCH of the first step MsgA in the two-step random access procedure initiated by the PRACH, etc., but it is not limited thereto.

In embodiments of the disclosure, if the UE determines (assumes) that the base station is switched from the energy saving state to the non-energy saving state, that is, the base station is successfully woken up by the UE, and the UE may perform at least one of the following behaviors.

1. The random access procedure is initiated based on the available PRACH resources in the non-energy saving state of the base station.

For example, the UE may initiate the random access procedure based on the all PRACH resources in the first PRACH resource pool. Compared with the UE's behavior in the energy saving state of the base station (only part of PRACH resources in the first PRACH resource pool may be used), the UE in the non-energy saving state of the base station may use a larger PRACH resource pool; or, the UE initiates the random access procedure based on the first PRACH resource pool and the second PRACH resource pool only used in the non-energy saving state of the base station. That is, compared with the UE's behavior in the energy saving state of the base station (only the first PRACH resource pool may be used), the UE in the non-energy saving state of the base statin may use a larger PRACH resource pool.

2. A scheduling request (SR) is transmitted based on the preconfigured PUCCH resource.

The periodic PUCCH resource configured for transmitting the SR is previously configured for the UE by the base station. The "previously" here means that the base station has preconfigured for the UE before the energy saving state, similarly hereinafter.

4. Uplink data is transmitted based on the preconfigured CG-PUSCH resource.

Type 1 CG-PUSCH and Type 2 CG-PUSCH are included, where the Type 1 CG-PUSCH resource is previously configured for the UE by the base station, and the Type 2 CG-PUSCH resource needs to be indicated and activated by DCI.

5. An SRS is transmitted based on the preconfigured periodic SRS or semi-persistent SRS.

6. A PUCCH is monitored based on the preconfigured PDCCH search space, including monitoring a UE-specific search space and a Type 3 common search space.

It includes monitoring all or some of Type0 PDCCH CSS, Type0A PDCCH CSS, Type1 PDCCH CSS, Type2 PDCCH CSS, Type3 PDCCH CSS and PDCCH USS, and monitored PDCCH search space is previously configured for the UE by the base station.

7. The preconfigured semi-persistent scheduling PDSCH is received.

8. The preconfigured periodic CSI-RS or semi-persistent CSI-RS is received.

Optionally, the base station's behavior woken up by the UE is not different from the base station's behavior in the conventional non-energy saving state (e.g., the non-energy saving state of the base station indicated by a broadcast signaling). Correspondingly, the UE's behavior after the UE wakes up the base station is not different from the UE's behavior in the non-energy saving state of the base station.

Or, the base station's behavior woken by the UE is different from the base station's behavior in the conventional non-energy saving state. Compared with the non-energy saving state of the base station indicated by the broadcast signaling, the base station woken by the UE here is only known by the specific UE, while other UEs do not know that the base station is woken up. In this case, the base station is woken up to serve the specific UE, not all UEs in the cell. For example, the use of many periodic broadcast channels/signals is still restricted, and only the use of periodic unicast channels/channels preconfigured to the specific UE is not restricted.

In the current NR system, the UE triggers the random access procedure only when a specific event occurs. The standard 38.300 has specified ten events that may trigger the random access procedure. The ten events may not all trigger the random access procedure in the energy saving state of the base station.

Specifically, the current standard 38.300 has specified that the following ten events may trigger the random access procedure.

1. An initial access occurs in a radio resource control (RRC) idle state. That is, the UE in the RRC idle stat initiates the random access procedure for establishing an initial access.

2. The RRC connection is reestablished. That is, the RRC connection is interrupted in the communication process, and the UE initiates the random access procedure for reestablishing the RRC connection.

3. In the RRC connected state, the uplink is out of synchronization, and the downlink (DL) or uplink (UL) data arrives. That is, the UE in the RRC connected state is out of uplink synchronization. If DL data arrives, the base station will indicate the UE to initiate the random access procedure for acquiring uplink synchronization; and, if UL data arrives, the UE will spontaneously initiate the random access procedure for acquiring uplink synchronization.

4. In the RRC connected state, the uplink data arrives, and there is no available PUCCH resource for transmitting the SR. That is, if uplink data arrives on the UE in the RRC connected state but there is no available PUCCH resource for transmitting the SR. the UE initiates the random access procedure for requesting an uplink resource.

5. The SR is failed. That is, the UE in the RRC connected state fails to successfully request an uplink resource through the SR. Once the SR is determined to be failed, the UE initiates the random access procedure for requesting an uplink resource.

6. The RRC synchronization reconfiguration (e.g., switching) is requested. That tis, the UE in the RRC connected state acquires the RRC reconfiguration through the random access procedure. For example, in the switching process, the UE initiates the random access procedure to the target base station for acquiring the RRC reconfiguration.

7. The RRC inactive state is switched from the RRC connected state. That is, the UE in the RRC inactive state is switched to the RRC connected state by initiating the random access procedure.

8. Timing alignment is established for a TAG. That is, the UE in the RRC connected state initiates, in a secondary cell corresponding to the second TAG, the random access procedure for acquiring the timing advance of the second TAG cell.

9. Other system information (SI) is requested. That is, the UE requests other SI to the base station by initiating the random access procedure.

10. The beam failure is recovered. That is, when the UE in the RRC connected state is determined to be failed in beam management, the beam management is recovered by initiating the random access procedure.

In embodiments of the disclosure, although the base station in the energy saving state may regularly monitor the PRACH, in order to reduce the power consumption of the base station to the greatest extent, only some urgent or important events on the UE side may trigger the random access procedure. For example, it is possible that only some of the ten existing events may trigger the random access procedure in the energy saving state of the base station. In other words, the UE determines, according to whether the base station is in the energy saving state, whether the random access procedure may be initiated.

Specifically, if the base station is in the energy saving state, the UE may only trigger the random access procedure based on the above some events. In other words, the above some events may not trigger the random access procedure. For example, only the related events of the arrival of uplink data can trigger the random access procedure in the energy saving state of the base station, for example, the above events 3, 4 and 5. For the above events 1, 2, 6, 7, 8, 9 and 10, if the base station is in the energy saving state, the UE may not initiate the random access procedure. This is because no uplink data may arrive behind these events. That is, the purpose of triggering the random access procedure by these events may not be to transmit uplink data.

In embodiments of the disclosure, the operation S102 may include: in the energy saving state of the base station, initiating the random access procedure to the base station based on the trigger of the predetermined event, wherein the predetermined event includes at least one of the following.

1. If uplink data arrives on a specific logical channel, the UE may initiate the random access procedure for transmitting uplink data.

2. In the RRC connected state, if uplink data arrives on a specific logical channel and the downlink or uplink is out of synchronization, the UE may initiate the random access procedure for acquiring uplink synchronization or downlink synchronization.

3. In the RRC connected state, if uplink data arrives on a specific logical channel and there is no available PUCCH resource for transmitting the SR, the UE may initiate the random access procedure for requesting an uplink resource.

4. In the RRC connected state, if uplink data arrives on a specific logical channel and the SR is failed, the UE may initiate the random access procedure for requesting an uplink resource.

In the trigger events of the random access procedure, the specific logical channel may be a logical channel with a priority higher than a preset threshold, wherein the preset threshold may be predefined or preconfigured. Or, the specific logical channel may also be logical channel preconfigured by the base station.

In embodiments of the disclosure, the operation S102 may include: determining, based on the state of the base station, whether the predetermined event may trigger the random access procedure;

if the base station is in the non-energy saving state, determining that the predetermined event may trigger the random access procedure; and if the base station is in the energy saving state, determining that the predetermined event may not trigger the random access procedure;

wherein the predetermined event includes at least one of the following:

1. an initial access occurs in an RRC idle state;

2. the RRC connection is reestablished;

3. in the RRC connected state, uplink data arrives, and the uplink or downlink is out of synchronization;

4. in the RRC connected state, uplink data arrives, and there is no available PUCCH resource for transmitting the SR;

5. the SR is failed;

6. the RRC synchronization reconfiguration is requested;

7. an RRC inactive state is switched to the RRC connected state;

8. timing alignment is established for a TAG;

9. other system information is requested; and 10. the beam failure is recovered.

The detailed introduction of these predetermined events may refer to the above description and will not be repeated here.

The method performed by a UE provided in embodiments of the disclosure may reduce the amount of PRACH resources to be monitored by the base station, thereby achieving the purpose of saving power on the base station side. The UE may also avoid the transmission of the PRACH on unavailable PRACH, thereby reducing the unnecessary power consumption of the UE.

An embodiment of the disclosure further provides a method performed by a base station.

Figure 6:
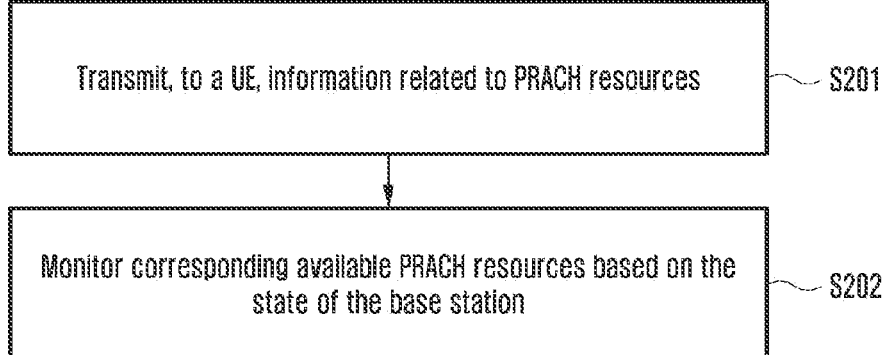
FIG. 6 is a flowchart of a method performed by a base station according to an embodiment of the disclosure.

FIG. 6 is a flowchart of a method performed by a base station according to an embodiment of the disclosure.

Referring to FIG. 6, the method includes the following actions.

In operation S201, information related to PRACH resources is transmitted to a UE.

The information related to PRACH resources is used by the UE to determine available PRACH resources in an energy saving state and/or non-energy saving state of the base station.

In operation S202, corresponding available PRACH resources are monitored based on the state of the base station.

Optionally, the operation S201 may specifically include at least one of the following ways.

Way 1: First information configured for indicating available part of PRACH resources and/or unavailable part of PRACH resources in a first PRACH resource pool in the energy saving state of the base station is transmitted to the UE.

The first information is used by the UE to determine available part of PRACH resources in the energy saving state of the base station.

Way 2: Second information configured for configuring a second PRACH resource pool is transmitted to the UE.

The second PRACH resource pool is only used in the energy saving state of the base station or the non-energy saving state of the base station, and the second information is used by the UE to determine available PRACH resources corresponding to the state of the base station.

Optionally, the first PRACH resource pool is configured according to a legacy of information elements, and the second PRACH resource pool is configured according to a new version of information elements.

Optionally, the first PRACH resource pol is configured according to RACH-ConfigCommon.

Optionally, the second PRACH resource pool is only used in the energy saving state of the base station, and the first PRACH resource pool is only used in the non-energy saving state of the base station; or, the second PRACH resource pool is only used in the non-energy saving state of the base station, and the first PRACH resource pool is used in the energy saving state of the base station and the non-energy saving state of the base station.

Optionally, the first information and/or the second information is indicated by at least one of the following signaling: an SIB, a PBCH, and DCI, wherein the DCI is cell-specific or UE-group-specific.

Optionally, the PRACH resources include ROs, and the first information indicates available part of ROs and/or unavailable part of ROs in the first PRACH resource pool through at least one of the following indication granularities:

all ROs in multiple PRACH cycles;

all ROs in one association cycle, the association cycle being an association cycle between PRACHs and SSBs;

all ROs in one PRACH cycle;

a group of ROs;

all ROs associated with one SSB index;

all ROs associated with one SSB burst set;

all ROs in one time slot;

all ROs on one time-domain resource; and one RO.

Optionally, the first information indicates available part of PRACH resources and/or unavailable part of PRACH resources in the first PRACH resource pool through at least one of the following indication granularities:

all PRACH resources associated with one SSB index; and all PRACH resources associated with one SSB burst set.

Optionally, the first information is indicated by a bit map, each bit in the bit map indicating that the RO or PRACH resource corresponding to the indication granularity is available or unavailable.

Optionally, the association between available part of PRACH resources in the first PRACH resource pool and SSBs in the energy saving state of the base station applies any one of the following:

an association the same as that in the non-energy saving state of the base station; and an association different from that in the non-energy saving state of the base station.

Optionally, the association between available part of PRACH resources in the first PRACH resource pool and SSBs in the energy saving state of the base station applying an association different from that in the non-energy saving state of the base station includes at least one of the following:

renumbering the available part of ROs, and associating, based on association parameters the same as those in the non-energy saving state of the base station, available part of PRACH resources in the first PRACH resource pool with SSBs; and renumbering the available part of ROs, and associating, based on association parameters different from those in the non-energy saving state of the base station, available part of PRACH resources in the first PRACH resource pool with SSBs.

Optionally, the association between available part of PRACH resources in the first PRACH resource pool and SSBs in the energy saving state of the base station applying an association different from that in the non-energy saving state of the base station includes at least one of the following:

associating, based on a legacy version of association parameters, available part of PRACH resources in the first PRACH resource pool with SSBs; and associating, based on a new version of association parameters, available part of PRACH resources in the first PRACH resource pool with SSBs.

Specifically, the operation S202 may specifically include: in the energy saving state of the base station, monitoring the corresponding available PRACH resource, the PRACH or the random access procedure initiated by the PRACH indicating a wake-up signaling, the wake-up signaling is configured for requesting the base station to switch from the energy saving state to the non-energy saving state.

Optionally, the PRACH or the random access procedure initiated by the PRACH indicating a wake-up signaling includes at least one of the following situations:

the wake-up signaling is implicitly indicated by the PRACH, and the PRACH has no random access function;

the wake-up signaling is implicitly indicated by the PRACH, and the PRACH has a random access function;

the wake-up signaling is indicated by the PUSCH of the third step Msg3 in the four-step random access procedure initiated by the PRACH; and the wake-up signaling is indicated by the PUSCH of the first step MsgA in the two-step random access procedure initiated by the PRACH.

Optionally, the method further includes upon receiving the wake-up signaling, transmitting a response signaling, the response signaling indicating whether the base station is switched from the energy saving state to the non-energy saving state.

Optionally, the response signaling is indicated by at least one of the following signaling:

the response signaling is implicitly indicated by a downlink physical signal sequence;

the response signaling is indicated by an information field in DCI;

the response signaling is implicitly indicated by scheduling DCI of the second step Msg2 in the four-step random access procedure initiated by the PRACH, or implicitly indicated by scheduling DCI of the second step MsgB in the two-step random access procedure initiated by the PRACH;

the response signaling is indicated by an information field in the scheduling DCI of the second step Msg2 in the four-step random access procedure initiated by the PRACH, or indicated by an information field in the scheduling DCI of the second step MsgB in the two-step random access procedure initiated by the PRACH;

the response signaling is implicitly indicated by the PDSCH of the fourth step Msg4 in the four-step random access procedure initiated by the PRACH, or implicitly indicated by the PDSCH of the second step MsgB in the two-step random access procedure initiated by the PRACH, and the Msg4 or MsgB indicates that the random access is successful in contention; and the response signaling is indicated by an information field contained in the PDSCH of the fourth step Msg4 in the four-step random access procedure initiated by the PRACH, or indicated by an information field contained in the PDSCH of the second step MsgB in the two-step random access procedure initiated by the PRACH, and the Msg4 or MsgB indicates that the random access is successful in contention.

Optionally, the base station has multiple energy saving states, and the wake-up signaling is configured for requesting the base station to switch from the current energy saving state to another energy saving state or the non-energy saving state.

Optionally, the PRACH includes at least one of the following:

a PRACH of the first step MsgA in the two-step random access procedure; and a PRACH of the first step Msg1 in the four-step random access procedure.

The method provided in embodiments of the disclosure corresponds to the method in the embodiments on the UE side, and the detailed functional descriptions and the achieved beneficial effects may specifically refer to the above description of the corresponding method in the embodiments on the UE side and will not be repeated here.

An embodiment of the disclosure provides a user equipment. The user equipment may specifically include a receiving module and a transmitting module, wherein, the determination module is configured to receive information related to PRACH resources, and determine available PRACH resources in an energy saving state and/or non-energy saving state of a base station; and the transmitting module is configured to transmit a PRACH to the base station based on the available PRACH resources and the state of the base station.

Optionally, the determination module is specifically configured to perform at least one of the following:

receiving first information configured for indicating available part of PRACH resources and/or unavailable part of PRACH resources in a first PRACH resource pool in the energy saving state of the base station, and determining available PRACH resources in the energy saving state of the base station according to the first information; and receiving second information configured for configuring a second PRACH resource pool, and determining corresponding available PRACH resources according to the second information and the state of the base station, wherein the second PRACH resource pool is used only in the energy saving state of the base station or the non-energy saving state of the base station.

Optionally, the transmitting module is specifically configured to: in the energy saving state of the base station, transmit a PRACH to the base station based on the available PRACH resources, the PRACH or the random access procedure initiated by the PRACH indicating a wake-up signaling, the wake-up signaling is configured for requesting the base station to switch from the energy saving state to the non-energy saving state.

Optionally, the user equipment further includes an acknowledgement module configured to perform any one of the following:

determining, in a first time unit after a first preset interval starting from transmitting the PRACH, that the base station is switched from the energy saving state to the non-energy saving state; and monitoring a response signaling of the base station after a second preset interval starting from transmitting the PRACH, and if the response signaling indicates that the base station is switched from the energy saving state to the non-energy saving state, determining, in a first time unit after a third preset interval starting from the response signaling, that the base station is switched from the energy saving state to the non-energy saving state.

Optionally, the transmitting module is specifically configured to: in the energy saving state of the base station, initiate a random access procedure to the base station based on of the trigger of a predetermined event;

wherein the predetermined event includes at least one of the following:

uplink data arrives on a specific logical channel;

in a radio resource control (RRC) connected state, uplink data arrives on the specific logical channel, and the downlink or uplink is out of synchronization;

in the RRC connected state, uplink data arrives on the specific logical channel, and there is no available PUCCH resource for transmitting the SR; and in the RRC connected state, uplink data arrives on the specific logical channel, and the SR is failed;

wherein the specific logical channel is a logical channel with a priority higher than a preset threshold.

An embodiment of the disclosure provides a base station. The base station may include a transmitting module and a monitoring module, wherein, the transmitting module is configured to transmit, to a UE, information related to PRACH resources, the information related to PRACH resources being used by the UE to determine available PRACH resources in an energy saving state and/or non-energy saving state of the base station; and the monitoring module is configured to monitor corresponding available PRACH resources based on the state of the base station.

Optionally, the transmitting module is specifically configured to perform at least one of the following ways.

Way 1: First information configured for indicating available part of PRACH resources and/or unavailable part of PRACH resources in a first PRACH resource pool in the energy saving state of the base station is transmitted to the UE.

The first information is used by the UE to determine available part of PRACH resources in the energy saving state of the base station.

Way 2: Second information configured for configuring a second PRACH resource pool is transmitted to the UE.

The second PRACH resource pool is only used in the energy saving state of the base station or the non-energy saving state of the base station, and the second information is used by the UE to determine available PRACH resources corresponding to the state of the base station.

Specifically, the monitoring module is specifically configured to: in the energy saving state of the base station, monitor the corresponding available PRACH resource, the PRACH or the random access procedure initiated by the PRACH indicating a wake-up signaling, the wake-up signaling is configured for requesting the base station to switch from the energy saving state to the non-energy saving state.

Optionally, the base station further includes a response module configured to: upon receiving the wake-up signaling, transmit a response signaling, the response signaling indicating whether the base station is switched from the energy saving state to the non-energy saving state.

The user equipment and the base station provided in the embodiments of the disclosure may perform the methods provided in the embodiments of the disclosure, and the implementation principles thereof are similar. The acts performed by the modules in the user equipment and the base station provided in the embodiments of the disclosure correspond to the steps in the methods provided in the embodiments of the disclosure. The detailed functional descriptions of the modules in the user equipment and the base station and the achieved beneficial effects may refer to the descriptions of the corresponding methods described above and will not be repeated here.

An embodiment of the disclosure provides an electronic device, including: a transceiver, which is configured to transmit and receive signals; and, a processor, which is coupled to the transceiver and configured to perform the steps in the above method embodiments. Optionally, the electronic device may be a UE, and the processor in the electronic device is configured to control to implement the steps in the method performed by a UE provided in the above method embodiments. Optionally, the electronic device may be a base station, and the processor in the electronic device is configured to control to implement the steps in the method performed by a base station provided in the above method embodiments.

Figure 7:
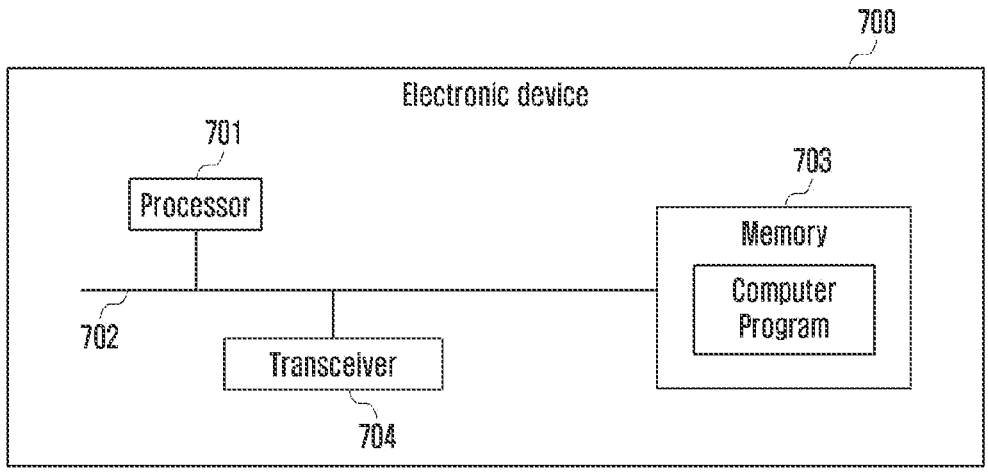
FIG. 7 is a schematic structure diagram of an electronic device according to an embodiment of the disclosure.

FIG. 7 is a schematic structure diagram of an electronic device according to an embodiment of the disclosure.

In an optional embodiment, an electronic device is provided, as shown in FIG. 7, wherein the electronic device 700 shown in FIG. 7 includes a processor 701 and a memory 703. Wherein, the processor 701 communicates with the memory 703, e.g., via a bus 702. Optionally, the electronic device 700 may also include a transceiver 704, which may be used for data interaction between this electronic device and other electronic devices, such as data transmission and/or data reception. It should be noted that the transceiver 704 is not limited to one in practical applications, and the structure of the electronic device 700 does not constitute a limitation of this application embodiment.

The processor 701 may be a central processing unit (CPU), a general-purpose processor, a digital signal processor (DSP), an application specific integrated circuit (ASIC), and a field programmable gate array (FPGA), or other programmable logic devices, transistor logic device, hardware component, or any combination thereof. It is possible to implement or execute the various logical blocks, modules, and circuits described in combination with the disclosures of the disclosure. The processor 701 may also be a combination of computing functions, such as a combination of one or more microprocessors, a combination of a DSP and a microprocessor, and so on.

The bus 702 can include a path for delivering information among the above components. The bus 702 may be a peripheral component interconnect (PCI) bus or an extended industry standard architecture (EISA) bus. The bus 702 may be divided into an address bus, a data bus, a control bus, and so on. For ease of illustration, only one bold line is shown in FIG. 7, but does not indicate that there is only one bus or type of bus.

The memory 703 may be a read-only memory (ROM) or other types of static storage devices that can store static information and instructions, a random access memory (RAM) or other types of storage devices that can store information and instructions. The memory 703 may also be electrically erasable programmable read-only memory (EE-PROM), compact disc read-only memory (CD-ROM), or other optical disk storage, optical disk storage (including compressed compact disc, laser disc, compact disc, digital versatile disc, blue-ray disc, etc.), magnetic disk storage medium or other magnetic storage devices, or any other medium capable of carrying or storing computer programs and capable of being accessed by a computer, but not limited to this.

The memory 703 is used to store computer programs for executing embodiments of the disclosure and is controlled for execution by the processor 701. The processor 701 is used to execute the computer program stored in memory 703 to implement the steps shown in the preceding method embodiment.

Embodiments of the disclosure provide a computer-readable storage medium having a computer program stored on the computer-readable storage medium, the computer program, when executed by a processor, implements the steps and corresponding contents of the foregoing method embodiments.

Embodiments of the disclosure also provide a computer program product including a computer program, the computer program when executed by a processor realizing the steps and corresponding contents of the preceding method embodiments.

The terms "first", "second", "third", "fourth", "1", "2", etc. (if present) in the specification and claims of this application and the accompanying drawings above are used to distinguish similar objects and need not be used to describe a particular order or sequence. It should be understood that the data so used is interchangeable where appropriate so that embodiments of the disclosure described herein can be implemented in an order other than that illustrated or described in the text.

It should be understood that while the flow diagrams of embodiments of the disclosure indicate the individual operational steps by arrows, the order in which these steps are performed is not limited to the order indicated by the arrows. Unless explicitly stated herein, in some implementation scenarios of embodiments of the disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and the embodiments of the disclosure are not limited thereto.

While the disclosure has been shown and described with reference to various embodiments thereof, it will be understood by those skilled in the art that various changes in form and details may be made therein without departing from the t spirit and scope of the disclosure as defined by the appended claims and their equivalents.

What is claimed is:

1. A method performed by a user equipment (UE) in a communication system, the method comprising:
   receiving, from a base station, first information indicating a part of physical random access channel (PRACH) resources in a first PRACH resource pool, wherein the part of PRACH resources are available or unavailable in an energy saving state of the base station;
   receiving, from the base station, second information configuring a second PRACH resource pool, wherein the second PRACH resource pool is used in the energy saving state of the base station or a non-energy saving state of the base station;
   identifying whether the base station is in the energy saving state or the non-energy saving state;
   determining available PRACH resources based on the identification and at least one of the first information or the second information; and
   transmitting, to the base station, a PRACH in at least one of the available PRACH resources.

2. The method according to claim 1, wherein the first PRACH resource pool is configured according to a random access channel common configuration (RACH-ConfigCommon) information element.

3. The method according to claim 1,
   wherein the second PRACH resource pool is only used in the energy saving state of the base station, and the first PRACH resource pool is only used in the non-energy saving state of the base station, or
   wherein the second PRACH resource pool is only used in the non-energy saving state of the base station, and the first PRACH resource pool is used in the energy saving state of the base station and the non-energy saving state of the base station.

4. The method according to claim 1,
   wherein the first information or the second information is indicated by at least one of:
      a system information block (SIB),
      a physical broadcast channel (PBCH), or
      downlink control information (DCI), and
   wherein the DCI is cell-specific or UE-group-specific.

5. The method according to claim 1, wherein the first information indicates available part of RACH occasions (ROs) or unavailable part of ROs in the first PRACH resource pool through at least one of the following indication granularities:
   all ROs in multiple PRACH cycles,
   all ROs in one association cycle, the association cycle being an association cycle between ROs and synchronization signal blocks (SSB),
   all ROs in one PRACH cycle,
   a group of ROs,
   all ROs associated with one SSB index,
   all ROs associated with one SSB burst set, all ROs in one time slot, all ROs on one time-domain resource, or one RO.

6. The method according to claim 1, wherein the first information indicates the part of PRACH resources in the first PRACH resource pool through at least one of the following indication granularities:

all PRACH resources associated with one SSB index, or all PRACH resources associated with one SSB burst set.

7. The method according to claim 5, wherein the first information is indicated by a bit map, each bit in the bit map indicating that the RO or PRACH resource corresponding to the indication granularity is available or unavailable.

8. The method according to claim 1, wherein association between the part of PRACH resources that is available in the first PRACH resource pool and synchronization signal blocks (SSBs) in the energy saving state of the base station applies one of:

an association the same as that in the non-energy saving state of the base station, or an association different from that in the non-energy saving state of the base station.

9. The method according to claim 8, wherein the association between the part of PRACH resources that is available in the first PRACH resource pool and the SSBs in the energy saving state of the base station applying an association different from that in the non-energy saving state of the base station comprises at least one of:

renumbering available part of ROs, and associating, based on association parameters the same as those in the non-energy saving state of the base station, the part of PRACH resources that is available in the first PRACH resource pool with the SSBs, or renumbering the available part of ROs, and associating, based on association parameters different from those in the non-energy saving state of the base station, the part of PRACH resources that is available in the first PRACH resource pool with the SSBs.

10. The method according to claim 1, wherein the PRACH is transmitted to the base station in the energy saving state and the PRACH or a random access procedure initiated by the PRACH indicates a wake-up signaling, the wake-up signaling configured for requesting the base station to switch from the energy saving state to the non-energy saving state.

11. The method according to claim 10, wherein PRACH or the random access procedure initiated by the PRACH indicating a wake-up signaling comprises at least one of:

the wake-up signaling is implicitly indicated by the PRACH, and the PRACH is not used for random access function, the wake-up signaling is implicitly indicated by the PRACH, and the PRACH is used for a random access function, the wake-up signaling is indicated by a physical uplink shared channel (PUSCH) of a third step Msg3 in a four-step random access procedure initiated by the PRACH, or the wake-up signaling is indicated by a PUSCH of a first step MsgA in a two-step random access procedure initiated by the PRACH.

12. The method according to claim 11, wherein the PRACH implicitly indicates the wake-up signaling, and wherein the method further comprises one of the following after transmitting a PRACH to the base station:

determining, in a first time unit after a first preset interval starting from transmitting the PRACH, that the base station is switched from the energy saving state to the non-energy saving state, or monitoring, after a second preset interval starting from transmitting the PRACH, a response signaling of the base station to determine whether the base station is switched from the energy saving state to the non-energy saving state, and in case that the response signaling indicates that the base station is switched from the energy saving state to the non-energy saving state, determining, in a first time unit after a third preset interval starting from the response signaling, that the base station is switched from the energy saving state to the non-energy saving state.

13. The method according to claim 12, wherein the response signaling is indicated by at least one of:

the response signaling being implicitly indicated by a downlink physical signal sequence, the response signaling being indicated by an information field in DCI, the response signaling being implicitly indicated by scheduling DCI of a second step Msg2 in the four-step random access procedure initiated by the PRACH, or implicitly indicated by scheduling DCI of a second step MsgB in the two-step random access procedure initiated by the PRACH, the response signaling being indicated by an information field in the scheduling DCI of a second step Msg2 in the four-step random access procedure initiated by the PRACH, or indicated by an information field in the scheduling DCI of a second step MsgB in the two-step random access procedure initiated by the PRACH, the response signaling being implicitly indicated by a physical downlink shared channel (PDSCH) of a fourth step Msg4 in the four-step random access procedure initiated by the PRACH, or implicitly indicated by a PDSCH of the second step MsgB in the two-step random access procedure initiated by the PRACH, and the Msg4 or MsgB indicating that the random access is successful in contention, or the response signaling being indicated by an information field contained in the PDSCH of the fourth step Msg4 in the four-step random access procedure initiated by the PRACH, or indicated by an information field contained in the PDSCH of the second step MsgB in the two-step random access procedure initiated by the PRACH, and the Msg4 or MsgB indicating that the random access is successful in contention.

14. A method performed by a base station in a communication system, the method comprising:

transmitting, to a user equipment (UE), first information indicating a part of physical random access channel (PRACH) resources in a first PRACH resource pool, wherein the part of PRACH resources are available or unavailable in an energy saving state of the base station;

transmitting, to the UE, second information configuring a second PRACH resource pool, wherein the second PRACH resource pool is used in the energy saving state of the base station or a non-energy saving state of the base station; and receiving, from the UE, a PRACH in at least one of available PRACH resources, wherein the available PRACH resources are based on whether the base station is in the energy saving state or the non-energy saving state and at least one of the first information or the second information.

15. A user equipment (UE) in a communication system, the UE comprising:

a transceiver; and a processor coupled to the transceiver and configured to:

receive, from a base station, first information indicating a part of physical random access channel (PRACH) resources in a first PRACH resource pool, wherein the part of PRACH resources are available or unavailable in an energy saving state of the base station, receive, from the base station, second information configuring a second PRACH resource pool, wherein the second PRACH resource pool is used in the energy saving state of the base station or a non-energy saving state of the base station, identify whether the base station is in the energy saving state or the non-energy saving state, determine available PRACH resources based on the identification and at least one of the first information or the second information, and transmit, to the base station, a PRACH in at least one of the available PRACH resources.

16. A base station in a communication system, the base station comprising:

a transceiver; and a processor coupled to the transceiver and configured to:

transmit, to a user equipment (UE), first information indicating a part of physical random access channel (PRACH) resources in a first PRACH resource pool, wherein the part of PRACH resources are available or unavailable in an energy saving state of the base station, transmit, to the UE, second information configuring a second PRACH resource pool, wherein the second PRACH resource pool is used in the energy saving state of the base station or a non-energy saving state of the base station, and receive, from the UE, a PRACH in at least one of available PRACH resources, wherein the available PRACH resources are based on whether the base station is in the energy saving state or the non-energy saving state and at least one of the first information or the second information.

* * * * *